US010713210B2

(12) United States Patent
Shamis et al.

(10) Patent No.: US 10,713,210 B2
(45) Date of Patent: Jul. 14, 2020

(54) DISTRIBUTED SELF-DIRECTED LOCK-FREE RDMA-BASED B-TREE KEY-VALUE MANAGER

(71) Applicant: Microsoft Technology Licensing, LLC, Redmond, WA (US)

(72) Inventors: Alexander Shamis, Seattle, WA (US); Yutaka Suzue, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 769 days.

(21) Appl. No.: 14/882,357

(22) Filed: Oct. 13, 2015

(65) Prior Publication Data
US 2017/0103039 A1    Apr. 13, 2017

(51) Int. Cl.
| | |
|---|---|
| *G06F 15/173* | (2006.01) |
| *G06F 16/22* | (2019.01) |
| *H04L 12/933* | (2013.01) |
| *H04L 29/08* | (2006.01) |

(52) U.S. Cl.
CPC .... *G06F 15/17331* (2013.01); *G06F 16/2246* (2019.01); *H04L 49/103* (2013.01); *H04L 67/1097* (2013.01)

(58) Field of Classification Search
CPC .......... G06F 15/17331; G06F 16/2246; G06F 9/544; H04L 49/103; H04L 67/1097
See application file for complete search history.

(56) References Cited

U.S. PATENT DOCUMENTS

| | | | |
|---|---|---|---|
| 6,360,220 B1 | 3/2002 | Forin | |
| 6,418,542 B1 * | 7/2002 | Yeager | ...................... G06F 9/46 |
| | | | 707/999.001 |

(Continued)

OTHER PUBLICATIONS

Christopher R Mitchell et al, "Building Fast, CPU Efficient Distributed Systems on Ultra-low latency, RDMA-Capable Networks", Sep. 1, 2015, ISBN; 978-1-339-32912-3 URL:// https://www.cs.nyu.edu/media/publications/mitchell-christopher.pdf (retrieved on Jan. 13, 2017).*

(Continued)

*Primary Examiner* — Patrice L Winder
*Assistant Examiner* — Aye M Aung
(74) *Attorney, Agent, or Firm* — Alleman Hall Creasman & Tuttle LLP

(57) ABSTRACT

A "Key-Value Manager" applies an RDMA-based memory allocator to implement a distributed and lock-free B-Tree based key-value store. In various implementations, the Key-Value Manager is implemented as a standalone library running concurrently on large numbers of networked computing devices. The RDMA-based memory allocator of the Key-Value Manager allocates and accesses the memory of the key-value store via various sequences of RDMA messages (e.g., RDMA reads, RDMA writes, and RDMA atomic compare and swap (CAS) operations). As such, CPUs of computing devices hosting the memory of the key-value store do not need to be notified of or involved in RDMA-based reads and writes to that memory. Consequently, CPU utilization for any computing device that hosts any portion of the key-value store is minimal, thereby enabling the Key-Value Manager to scale to very large numbers of concurrent accesses by very large numbers of computing devices.

20 Claims, 10 Drawing Sheets

(56) References Cited

U.S. PATENT DOCUMENTS

| | | | |
|---|---|---|---|
| 6,697,878 | B1 | 2/2004 | Imai |
| 7,403,945 | B2 | 7/2008 | Lin et al. |
| 7,409,525 | B1 | 8/2008 | Clark et al. |
| 7,565,454 | B2 | 7/2009 | Zuberi |
| 7,610,348 | B2 | 10/2009 | Kisley |
| 7,617,290 | B1 | 11/2009 | Cheriton |
| 7,617,370 | B2 | 11/2009 | Jernigan, IV et al. |
| 7,702,743 | B1 | 4/2010 | Wong |
| 7,756,943 | B1 | 7/2010 | Wong |
| 7,761,619 | B2 | 7/2010 | Feng et al. |
| 7,917,597 | B1 | 3/2011 | Lentini |
| 8,155,135 | B2 | 4/2012 | Aloni et al. |
| 8,205,015 | B2 | 6/2012 | Flynn et al. |
| 8,250,047 | B2* | 8/2012 | McKenney ......... G06F 9/30087 707/704 |
| 8,255,047 | B1* | 8/2012 | Wohlgemuth ....... A61N 1/3622 128/901 |
| 8,271,996 | B1 | 9/2012 | Gould et al. |
| 8,407,428 | B2 | 3/2013 | Cheriton et al. |
| 8,578,127 | B2 | 11/2013 | Thatcher et al. |
| 8,676,851 | B1 | 3/2014 | Nesbit et al. |
| 8,688,798 | B1 | 4/2014 | Lentini |
| 8,972,627 | B2 | 3/2015 | Strasser et al. |
| 9,058,122 | B1 | 6/2015 | Nesbit et al. |
| 2002/0073257 | A1* | 6/2002 | Beukema ............ H04L 12/4633 710/105 |
| 2002/0166078 | A1* | 11/2002 | Oldfield ................ G06F 3/0613 714/6.11 |
| 2003/0145230 | A1 | 7/2003 | Chiu et al. |
| 2003/0202247 | A1 | 10/2003 | Niv et al. |
| 2004/0049580 | A1 | 3/2004 | Boyd et al. |
| 2004/0109234 | A1 | 6/2004 | Levola |
| 2004/0150717 | A1* | 8/2004 | Page ..................... G07C 5/0891 348/148 |
| 2004/0225719 | A1 | 11/2004 | Kisley et al. |
| 2005/0204384 | A1* | 9/2005 | Yuen .................. H04N 5/44543 725/43 |
| 2009/0204755 | A1* | 8/2009 | Rushworth ............. G06F 9/526 711/110 |
| 2012/0124282 | A1 | 5/2012 | Frank et al. |
| 2012/0198284 | A1 | 8/2012 | Li |
| 2012/0233438 | A1* | 9/2012 | Bak ..................... G06F 12/0223 711/206 |
| 2013/0054726 | A1* | 2/2013 | Bugge ....................... G06F 9/52 709/212 |
| 2013/0086183 | A1 | 4/2013 | Frank et al. |
| 2013/0159449 | A1 | 6/2013 | Taylor et al. |
| 2013/0246714 | A1 | 9/2013 | Lv et al. |
| 2013/0262384 | A1* | 10/2013 | Noguchi ............. G06F 11/1662 707/634 |
| 2014/0089346 | A1 | 3/2014 | Li |
| 2014/0143368 | A1 | 5/2014 | Anderson |
| 2014/0317336 | A1 | 10/2014 | Fitch et al. |
| 2014/0325012 | A1* | 10/2014 | Guerin ............. G06F 15/17331 709/212 |
| 2014/0359044 | A1 | 12/2014 | Davis et al. |
| 2014/0359145 | A1 | 12/2014 | Metzler et al. |
| 2014/0359146 | A1 | 12/2014 | Metzler et al. |
| 2015/0067086 | A1 | 3/2015 | Adriaens et al. |
| 2015/0186051 | A1 | 7/2015 | Gurajada |
| 2016/0077975 | A1 | 3/2016 | Stabrawa et al. |
| 2016/0182433 | A1 | 6/2016 | McDaid et al. |
| 2016/0308968 | A1* | 10/2016 | Friedman ............ H04L 67/2842 |
| 2016/0378712 | A1 | 12/2016 | Amit et al. |
| 2017/0091246 | A1* | 3/2017 | Risvik ............... G06F 17/30324 |

OTHER PUBLICATIONS

Tyler Szepesi et al:"Designing a low latency cuckoo hash table for wirte intensive workloads using RDMA", Jan. 1, 2014, URL: https://cs.uwaterloo.ca/-bernard/nessie.pdf.*
Christopher R Mitchell etal, "Building Fast, CPU Efficient Distributed Systems on Ultra-low latency, RDMA-Capable Networks", Sep. 1, 2015, ISBN; 978-1-339-32912-3 URL://https://www.cs.nyu.edu/media/publications/mitchell-christopher.pdf (retrieved on Jan. 13, 2017 (Year: 2015).*
Tyler Szepesi etal:"Designing a low latency cuckoo hash table for wide intensive workloads using RDMA", Jan. 1, 2014, URL: https://cs.uwaterloo.ca/-bernard/nessie.pdf (Year: 2014).*
Aguilera, et al., "A Practical Scalable Distributed B-Tree", In Journal of the VLDB Endowment, vol. 1, Issue 1, Aug. 24, 2008, 12 Pages.
Dragojevic, et al., "No compromises: distributed transactions with consistency, availability, and performance", In Proceedings of the 25th Symposium on Operating Systems Principles, Oct. 4, 2015, pp. 54-70.
Mitchell, Christopher R, "Building Fast, CPU-Efficient Distributed Systems on Ultra-Low Latency, RDMA-Capable Networks", A Dissertation Submitted in Partial Fulfillment of the Requirements for the Degree of Doctor of Philosophy in Department of Computer Science, Courant Institute of Mathematical Sciences, New York University, Sep. 1, 2015, 110 Pages.
"International Search Report and Written Opinion Issued in PCT Application No. PCT/US2016/056224", dated Feb. 3, 2017, 11 Pages.
"Second Written Opinion Issued in PCT Application No. PCT/US2016/056224", dated Oct. 16, 2017, 6 Pages.
Bays, Carter, "A Comparison of Next-Fit, First-Fit, and Best-Fit", In Magazine of Communications of the ACM, vol. 20, Issue 3, Mar. 1977, pp. 191-192.
Behringer, Benjamin, "Memory Management for Concurrent RDMA: A Design for a Key-Value Store", In Thesis, Jun. 3, 2014, 87 pages.
Bonwick, Jeff, "The Slab Allocator: An Object-Caching Kernel Memory Allocator", In Proceedings of the USENIX Summer Technical Conference, vol. 1, Jun. 6, 1994, 18 pages.
Choi, et al., "A Remote Memory System for High Performance Data Processing", In International Journal of Future Computer and Communication, vol. 4, No. 1, Feb. 2015, pp. 50-54.
Corbet, The SLUB allocator, Published on: Apr. 11, 2007 Available at: http://lwn.net/Articles/229984/.
Dragojevic, et al., "FaRM: Fast Remote Memory", In Proceedings of 11th USENIX Symposium on Networked Systems Design and Implementation, Apr. 2, 2014, 15 pages.
Kalia, et al., "Using RDMA Efficiently for Key-Value Services", In Proceedings of ACM Conference on SIGCOMM, Aug. 17, 2014, pp. 295-306.
Mackall, Matt, "SLOB Allocator: Simple List of Blocks", Published on: Mar. 30, 2012 Available at: http://staff.osuosl.org/~bkero/slob.c.
Michael, Maged M., "Scalable Lock-Free Dynamic Memory Allocation", In Proceedings of ACM SIGPLAN Conference on Programming Language Design and Implementation, Jun. 9, 2004, pp. 1-12.
Noronha, et al., "Designing NFS with RDMA for Security, Performance and Scalability", In Proceedings of International Conference on Parallel Processing, Sep. 10, 2007, 8 pages.
Noureddine, Wael, "NFS/RDMA over 40Gbps iWARP", Retrieved on: Mar. 26, 2015, Available at: http://www.chelsio.com/wp-content/uploads/resources/SDC2014_Chelsio_NFSoRDMA.pdf.
Ongaro, et al., "Fast Crash Recovery in RAMCloud", In Proceedings of the Twenty-Third ACM Symposium on Operating Systems Principles, Oct. 23, 2011, pp. 29-41.
Ousterhout, et al., "The Case for RAMClouds: Scalable High-Performance Storage Entirely in DRAM", In Proceedings of ACM SIGOPS Operating Systems Review, vol. 43, Issue 4, Dec. 2009, pp. 1-14.
Stuedi, et al., "jVerbs: Ultra-Low Latency for Data Center Applications", In Proceedings of ACM Symposium on Cloud Computing, Oct. 1, 2013, 14 pages.
Szepesi, et al., "Designing a Low-Latency Cuckoo Hash Table for Write-Intensive Workloads Using RDMA", Retrieved on: Mar. 26, 2015, Available at: https://cs.uwaterloo.ca/~bernard/nessie.pdf.
Tanenbaum, Andrew S., "Modern Operating Systems", In Proceedings of Prentice Hall, Dec. 21, 2007, 552 pages.
Wikipedia, Memory Pool, Retrieved on: Mar. 29, 2015 Available at: http://en.wikipedia.org/wiki/Memory_pool.

"Final Office Action Issued in U.S. Appl. No. 14/947,473", dated Sep. 24, 2018, 7 Pages.
"Non Final Office Action Issued in U.S. Appl. No. 14/947,473", dated Mar. 30, 2018, 8 Pages.
"International Preliminary Report on Patentability Issued in PCT Application No. PCT/US2016/056224", dated Mar. 5, 2018, 11 Pages.
"International Preliminary Report on Patentability Issued in PCT Application No. PCT/US2016/050327", dated Oct. 2, 2017, 6 Pages.
"Non Final Office Action Issued in U.S. Appl. No. 14/852,537", dated May 3, 2019, 12 Pages.
"Final Office Action Issued in U.S. Appl. No. 14/852,537", dated Aug. 23, 2019, 13 Pages.
"Office Action Issued in European Patent Application No. 16764045.7", dated Jul. 1, 2019, 4 Pages.
Shaw, Peling Andrew, U.S. Notice of Allowance, U.S. Appl. No. 14/728,745, dated Jul. 5, 2017, pp. 1-8.
International Search Report and Second Written Opinion Issued in PCT Application No. PCT/US2016/050327, dated Jul. 4, 2017.
"International Search Report and Written Opinion Issued in PCT Application No. PCT/US2016/034208", dated Aug. 5, 2016, 10 Pages.
Bonwick, et al., "Magazines and Vmem: Extending the Slab Allocator to Many CPUs and Arbitrary Resources", Retrieved From <<http://www.parrot.org/sites/www.parrot.org/files/vmem.pdf>>, Jan. 4, 2002, 20 Pages.
Shaw, Peling Andrew, U.S. Office Action, U.S. Appl. No. 14/728,745, dated Feb. 8, 2017, pp. 1-8.
International Search Report and Written Opinion Issued in PCT Application No. PCT/US16/061497 dated Feb. 2, 2017, 10 Pages.
"Non Final Office Action Issued in U.S. Appl. No. 14/852,537", dated Dec. 23, 2019, 10 Pages.
"Notice of Allowance Issued in U.S. Appl. No. 14/852,537", dated Apr. 1, 2020, 9 Pages.
Chung, et al., "Using RDMA for Lock Management", In Publication of https://arxiv.org/abs/1507.03274v2, Jul. 20, 2015, 6 Pages.

* cited by examiner

DISTRIBUTED SELF-DIRECTED LOCK-FREE RDMA-BASED B-TREE KEY-VALUE MANAGER

BACKGROUND

In general, direct memory access (DMA) provides various techniques that enable a device or process of a local host computing device to directly read and write local memory of that host device without interrupting the host's CPU(s). In contrast, remote direct memory access (RDMA), which is increasingly being deployed in data centers, extends traditional DMA-based techniques to enable a remote device or process to directly read and write memory of a remote computing device without interrupting the CPU(s) of the remote computing device. Existing RDMA-based techniques, such as, for example, InfiniBand, iWARP, RDMA over Converged Ethernet (RoCE), etc., make use of RDMA-enabled network interface controller (NICs).

Typical key-value stores, also referred to as key-value databases, enable storage, retrieval and management of associative arrays such as a dictionary or hash. Key-value stores typically contain a collection of objects, or records, which in turn have many different fields within them, each containing data. These records are stored and retrieved using a key from the key-value store that uniquely identifies the record, and is used to locate and access specific data within the database.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

A "Key-Value Manager," as described herein, provides a distributed and lock-free RDMA based B-Tree key-value store. Any number of separate key-value stores may be created, maintained, and accessed by the Key-Value Manager via various sequences of one-way RDMA messages (e.g., RDMA reads, RDMA writes, and RDMA atomic compare and swap (CAS) operations). As such, the CPUs of the computing devices that host the memory of the key-value store do not need to be notified of, or involved in, RDMA-based reads, writes or CAS operations on that memory. Consequently, CPU utilization for any computing device that hosts any portion of the key-value store is minimal, thereby enabling the Key-Value Manager to scale to very large numbers of concurrent accesses by very large numbers of computing devices.

In various implementations, the Key-Value Manager is implemented as a standalone library that runs concurrently on large numbers of networked computing devices. Memory holding the key-value store is managed and distributed across multiple computing devices using any desired memory management technique. However, in various implementations, this memory is managed by an optional RDMA-based memory allocator component of the Key-Value Manager. In either case, after the memory has been allocated for use by the Key-Value Manager, the Key-Value Manager makes use of that memory to construct, maintain, and provide lock-free accesses to the key-value store via RDMA messaging. Further, the memory hosting the key-value store may be replicated across multiple computing devices for redundancy.

The distributed nature of the key-value store enabled by self-directed instances of the Key-Value Manager running on each client means that no central computer (or multiple computers) are needed to control or maintain the key-value store. Further, using RDMA messaging to manage metadata portions of each node enables any networked computer to concurrently access the key-value store (e.g., concurrent reads, writes, and/or CAS operations) hosted on any computing device without consideration of whether any other networked computer is concurrently attempting to access that same memory. In various implementations, node write collisions are avoided by applying the Key-Value Manager of any client writing to a particular node of the key-value store to perform an RDMA CAS operation to flip a reservation bit (e.g., hosted in a separate reservation bitmap or the like) to reserve that node (e.g., "0" if free, or "1" if reserved). In various implementations, each computer that hosts any memory of the key-value store includes a separate reservation bitmap or the like corresponding to that particular memory. Once reserved, no other client can write to that node. Following successful completion of the write to the reserved node, a second CAS operation is then performed to flip the bit back so that the node is available for further writes by any client.

Because the memory of the key-value store is distributed across multiple computing devices, any particular client may traverse the B-Tree across one or more host computing devices to obtain a particular value from the key-value store by following memory references from the root of the B-Tree to a leaf node of the B-Tree. Generally, this traversal begins at a root node of the B-Tree, and continues through one or more branches (also referred to as child nodes or internal nodes) of the B-Tree to a leaf node of the B-Tree to obtain a reference to the memory location of the value being sought by the client. The root of the B-Tree based key-value store is stored in a secure memory location that is available in a placement library or the like, and that is published (or provided on request) to each of the clients in the RDMA-based network. The root node typically does not change or move. Further, in various implementations, the root node (and any other nodes of the B-Tree based key-value store) is replicated so that if the machine hosting any particular node goes offline or fails for any reason, one or more replicated backups at known or publicized locations will be available for use by any client.

For example, in various implementations, the Key-Value Manager is implemented across multiple networked computing devices in communication via RDMA-enabled network interface cards (NIC). The Key-Value Manager provides a dynamic B-Tree based key-value store distributed across two or more of the networked computing devices acting as hosts. A plurality of the networked computing devices acting as clients concurrently perform self-directed lock-free reads of the key-value store. Further, a plurality of the networked computing devices acting as servers concurrently perform self-directed lock-free writes to particular memory locations of the key-value store. Further, each lock-free write is performed via a combination of an RDMA-based reads and CAS operations to reserve the particular memory location followed by an RDMA-based write to that reserved memory location.

The Key-Value Manager described herein provides various techniques for applying RDMA messaging to provide a fast lock-free B-Tree based key-value store in shared memory distributed across multiple servers in an RDMA-based network. The distributed and lock-free nature of the key-value store reduces latency and improves throughput in the RDMA-based network while enabling the B-Tree based key-value store to scale to very large numbers of concurrent accesses by multiple clients. In addition to the benefits described above, other advantages of the Key-Value Manager will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
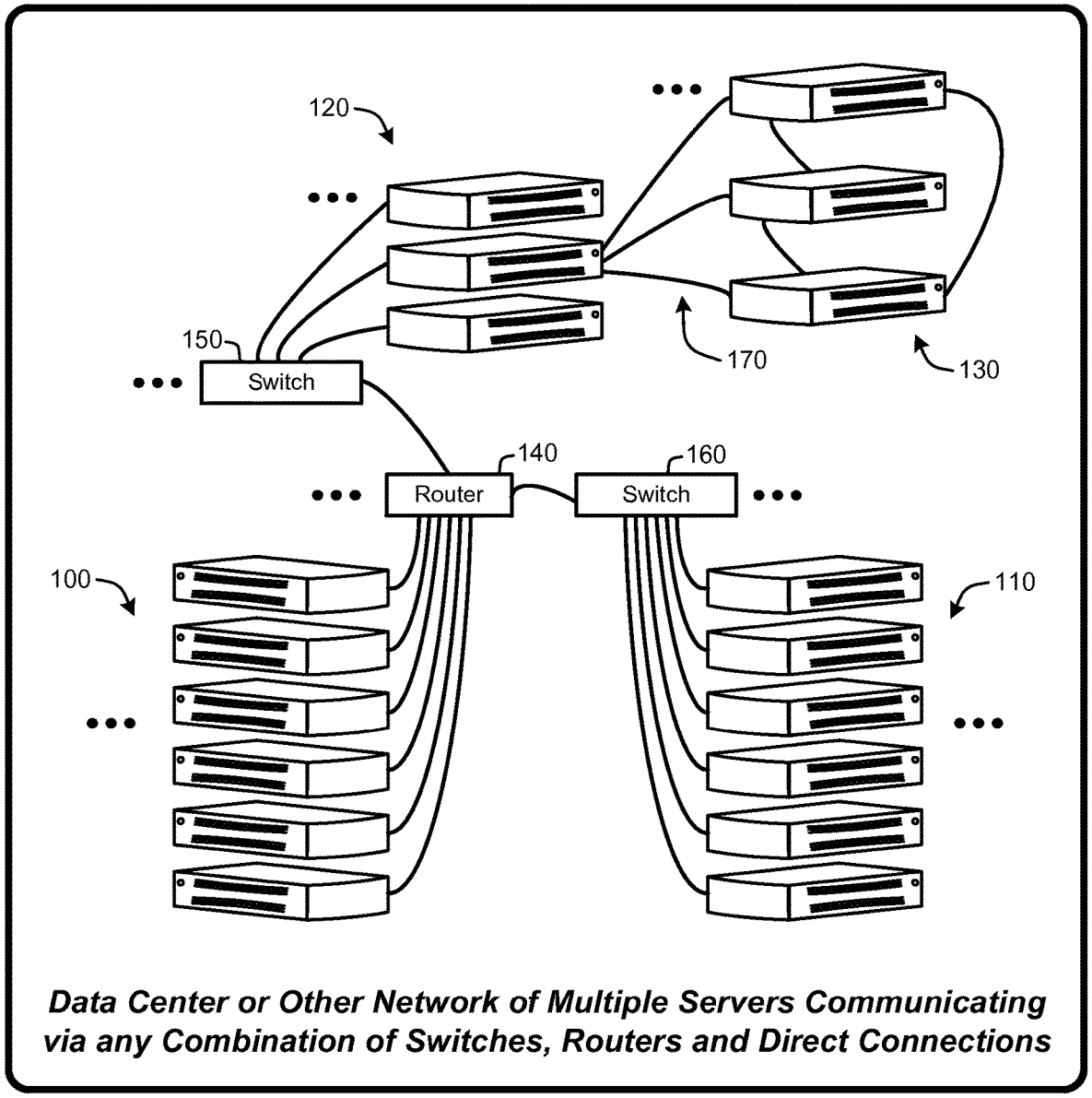
FIG. 1 illustrates an exemplary data center or other network of servers communicating via any combination of RDMA-enabled switches, routers and direct connections for use with a "Key-Value Manager," as described herein.

In the following description of various implementations of a "Key-Value Manager," reference is made to the accompanying drawings, which form a part hereof, and in which is shown by way of illustration specific implementations in which the Key-Value Manager may be practiced. Other implementations may be utilized and structural changes may be made without departing from the scope thereof.

Specific terminology will be resorted to in describing the various implementations described herein, and it is not intended for these implementations to be limited to the specific terms so chosen. Furthermore, it is to be understood that each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Key-Value Manager. Further, the appearance of such phrases throughout the specification are not necessarily all referring to the same implementation, and separate or alternative implementations are not mutually exclusive of other implementations. The order described or illustrated herein for any process flows representing one or more implementations of the Key-Value Manager does not inherently indicate any requirement for the processes to be implemented in the order described or illustrated, and any such order described or illustrated herein for any process flows do not imply any limitations of the Key-Value Manager.

As utilized herein, the terms "component," "system," "client," "host," "server," and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server itself can be a component. One or more components can reside within a process and a component can be localized on one computer and/or distributed between two or more computers. Further, in the context of the Key-Value Manager, any of a plurality of networked servers may concurrently or separately act as either or both client computing devices and host computing devices. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction

In various implementations, the Key-Value Manager enables multiple servers (e.g., any combination of clients and hosts) to perform concurrent self-directed reads and writes of a B-Tree based key-value store without the use of a central controller or the like. Memory holding the key-value store is managed and distributed across multiple computing devices using any desired memory management technique. However, in various implementations, this memory is managed by an optional RDMA-based memory allocator component of the Key-Value Manager. Further, the distributed nature of the shared memory and the B-Tree based key-value store enabled by the Key-Value Manager means that if the root node points to Branch-A, which in turn points to Branch-B, which in turn points to Leaf-C, each of these nodes can be, but do not need to be, hosted by the same computing device or by any two or more different computing devices in the RDMA-based network.

When traversing the tree for the purpose of reading a particular key-value/pointer pairs, the Key-Value Manager performs separate RDMA reads of each of the node of the key-value store to obtain a sequence of memory references, with each reference pointing to the next node to be read, until the desired node is reached. Each node of the key-value store includes a metadata section in addition to the key-value/pointer pairs comprising the node. In various implementations, this metadata includes, but is not limited to, a single checksum computed from all the key-value/pointer pairs of the node. As such, each client performing a node read computes a checksum from the key-value/pointer pairs of the node and compares the computed checksum to the checksum read from the node. So long as the checksum match, the key-value/pointer pairs are accepted as being valid.

Further, when any key-value/pointer pair is written to a node, the writing client first reserves that node via an RDMA CAS operation to flip a reservation bit (e.g., hosted in a node reservation bitmap or the like) corresponding to that node prior to performing an RDMA write to that node. In various implementations, each computer that hosts any memory of the key-value store includes a separate local reservation bitmap or the like corresponding to that particular memory. However, in various implementations, an optional global reservation bitmap can be separately hosted on any server to allow reservations of any node of the key-value store. Upon successful completion of that RDMA write, the client then releases the reservation of the node by flipping the bit back to show the node as free. When performing the RDMA write to the node, the client first reads the node. The client then computes a new checksum for the node based on the new key-value/pointer pairs to be written to the node and any remaining key-value/pointer pairs in the node. Then, when performing the RDMA write to the node, the new checksum is written to the metadata of that node along with all of the key-value/pointer pairs for the node.

As such, during the very brief period in which an RDMA write on the node is being performed by a client, any other client reading the node via an RDMA read operation may compute a checksum that will not match the checksum in the metadata. The use of such checksums protects against potential read/write or write/write collisions where the data may be in an unknown state. Consequently, in the event of a checksum mismatch, the client will repeat the read until such time as the computed checksum matches the checksum in the metadata. Writes happen so quickly that if there is ever a checksum mismatch, by the time a second read is performed (typically on the order of tens of microseconds), the write is typically complete and the checksums will then match.

As illustrated by FIG. 1, the Key-Value Manager may be configured for use with any desired network configuration including any combination of servers (100, 110, 120 and 130) communicating via any combination of RDMA-enabled routers 140, switches (150 and 160), and direct connections 170. Advantageously, the communications and messaging techniques enabled by the Key-Value Manager is scalable to any number of networked computers and any number of concurrent read and write operations on the key-value store via lock-free RDMA reads and writes between any number of the networked computers.

Figure 2:
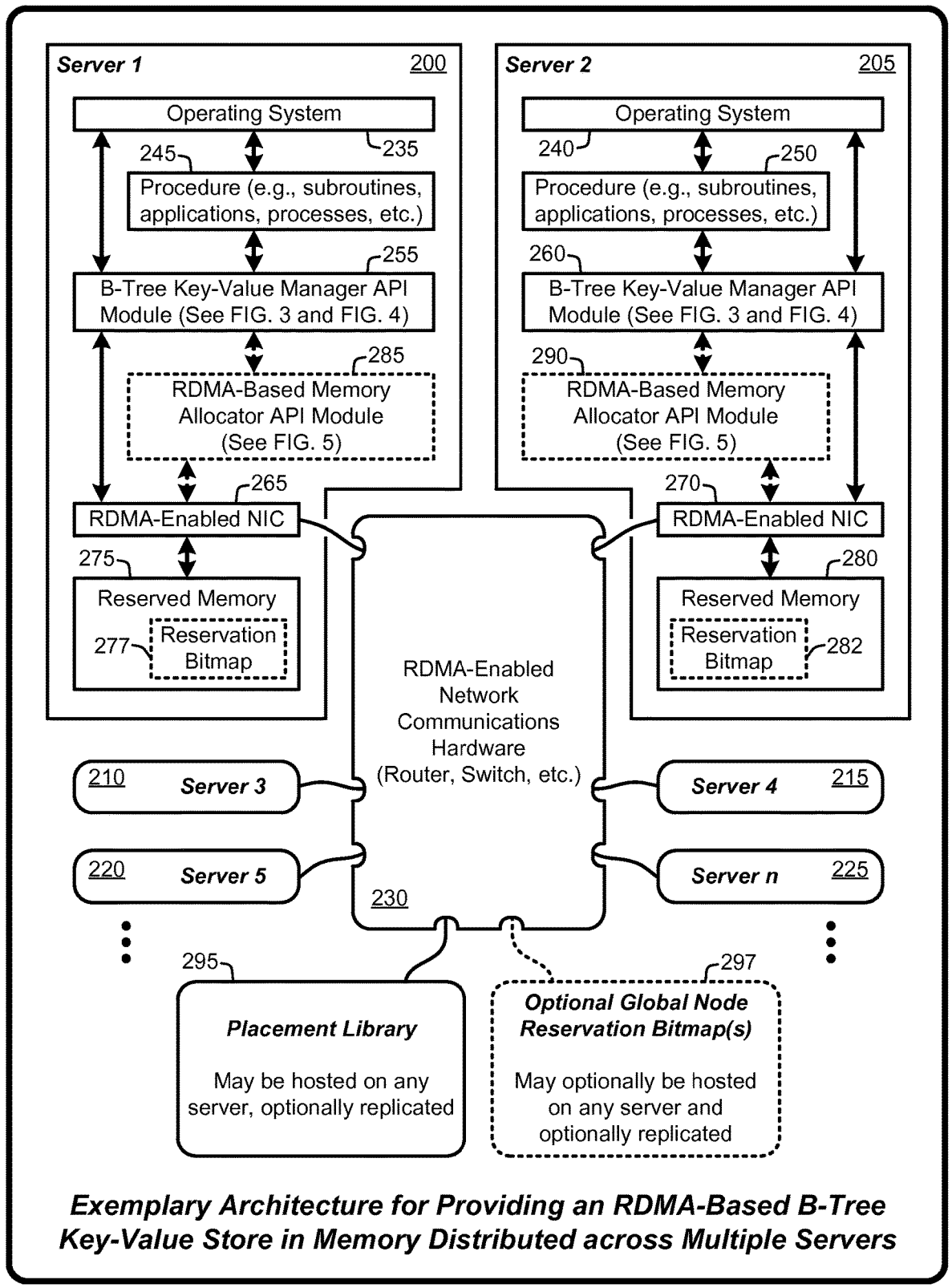
FIG. 2 illustrates a general architectural diagram for applying the Key-Value Manager to provide an RDMA-based B-Tree key-value store.

FIG. 2 illustrates a high-level exemplary architecture of the Key-Value Manager that shows various implementations of the Key-Value Manager. However, FIG. 2 is not intended to provide an exhaustive or complete illustration of every possible implementation of the Key-Value Manager as described throughout this document. In addition, any boxes and interconnections between boxes that may be represented by broken or dashed lines in FIG. 2 represent alternate implementations of the Key-Value Manager described herein. Further, any or all of these alternate implementations, as described herein, may be used in combination with other alternate implementations that are described throughout this document.

In particular, a plurality of servers (200, 205, 210, 215, 220, and 225) are configured as a network via RDMA-enabled network communications hardware 230 such as a router, switch, or other networking hardware or infrastructure. Each of the servers (200, 205, 210, 215, 220, and 225) may operate as either or both a client (e.g., reading and writing to the key-value store) and a host (hosting a portion of the distributed shared memory of the key-value store) with respect to any of the other servers in the network. In addition, any server acting as a client with respect to one or more other hosts may concurrently be acting as a host with respect to one or more other clients.

Further, in various implementations, each of the servers (200, 205, 210, 215, 220, and 225) is configured to run an operating system (e.g., 235, 240), which in turn may execute one or more procedures (e.g., 245, 250). A B-Tree Key-Value Manager API (255, 260) resides on each server (200, 205, 210, 215, 220, and 225), and is applied to perform RDMA-based reads, writes and CAS operations on the key-value store via RDMA-enables NICs (265, 270) of each server.

The key-value store is placed in distributed reserved memory (275, 280) that may be hosted by any or all of the servers (200, 205, 210, 215, 220, and 225). As mentioned above, the memory holding the key-value store is managed and distributed across multiple computing devices using any desired memory management technique. However, in various implementations, this memory is managed by an optional RDMA-Based Memory Allocator API Module (285, 290) that resides on each server (200, 205, 210, 215, 220, and 225), and is applied to intercept and handle any memory allocation requests from the B-Tree Key-Value Manager API (255, 260). In various implementations, the optional RDMA-Based Memory Allocator API Module (285, 290) may also intercept and handle any memory allocation requests from any procedure (e.g., 245, 250) or the operating system (e.g., 235, 240) executing on each particular server. The Key-Value Manager API is also referred to herein as either a memory allocator API module, or simply an API.

When accessing any key-value store enabled by the Key-Value Manager, in various implementations, clients may obtain the address of the root node of any particular key-value store, and any replicas, via a placement library 295 or the like. In other words, the placement library 295 provides a mechanism to place and discover the location of the particular key-value stores (and optional replicas) via a friendly name or other identifier associated with the key-value store and known to each of the clients. The placement library 295 may be hosted on any server and optionally replicated.

In addition, as mentioned above, when writing to the key-value store, clients first reserve that node via a reservation bit or the like by flipping that bit with an RDMA CAS operation. In various implementations, a node reservation bitmap (277, 282) is hosted in or in conjunction with the reserved memory (275, 280) of the corresponding server (200, 205, 210, 215, 220, and 225) or optionally implemented as a global reservation bitmap 297 (or other data structure). In either case, the node reservation bitmap (277, 282, or 297) is applied to reserve any particular node for write by any particular client. More specifically, in various implementations, each server (200, 205, 210, 215, 220, and 225) that hosts any memory (275, 280) of the key-value store includes a separate local reservation bitmap (277, 282) corresponding to that particular memory.

The use of local reservation bitmaps (277, 282) for the reserved memory of each server simplifies the reservation process since any knowledge of the address of any particular node will inherently provide the address of the corresponding reservation bitmap on the server hosting the memory of that node. However, by using some additional record-keeping functionality (e.g., tracking whether a server is online or otherwise operational, addressing potential reservation request races between different servers for the same node, etc.), one or more optional global instances of the node reservation bitmap 297 for the entire key-value store (or particular sections of the key-value store) may be hosted on any server and optionally replicated. In this case, the location or address of the node reservation bitmap 297 can be obtained via the placement library 295.

Figure 3:
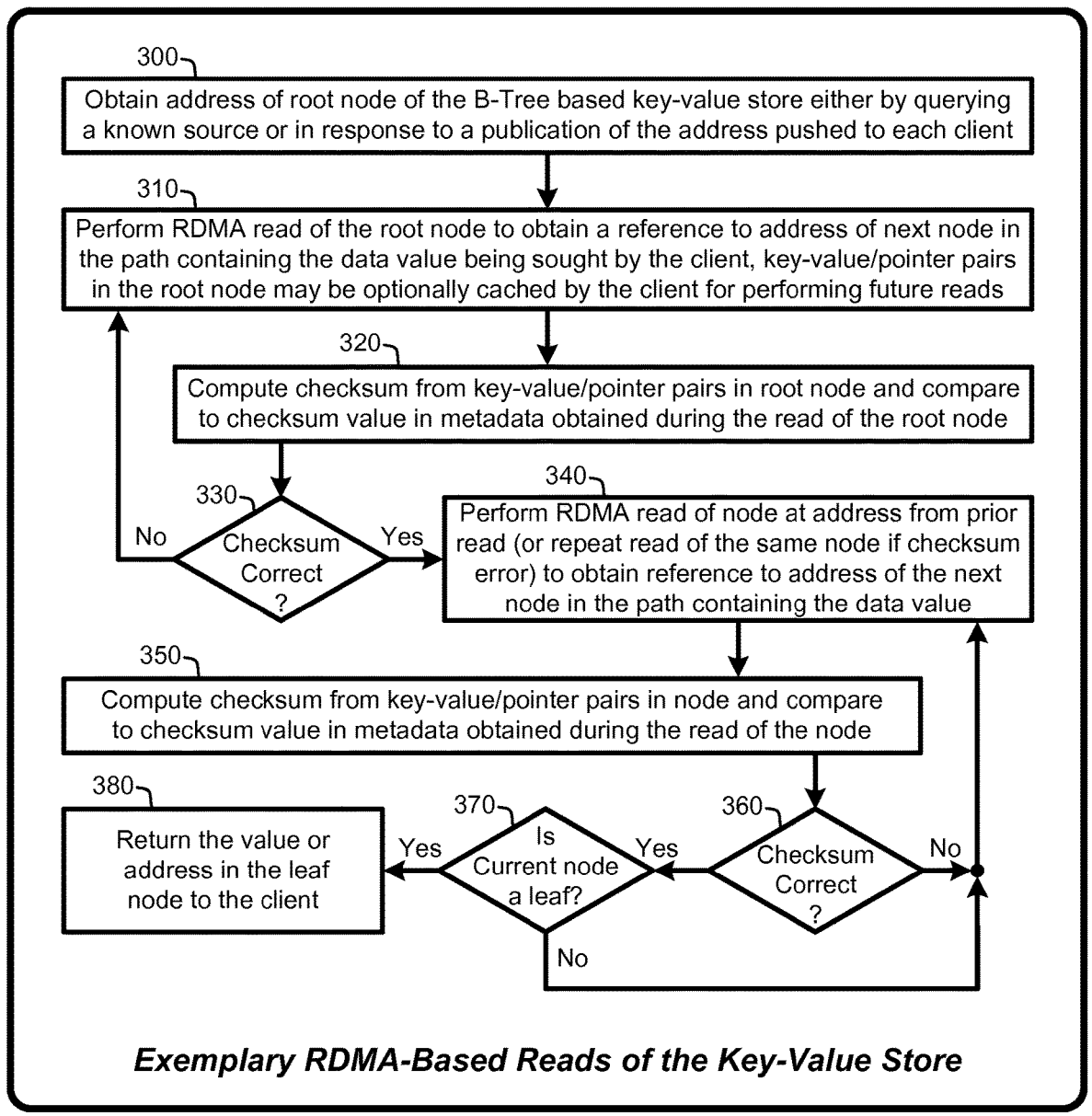
FIG. 3 provides a general flow diagram that illustrates various exemplary techniques for effecting RDMA-based reads of the B-Tree key-value store.
Figure 4:
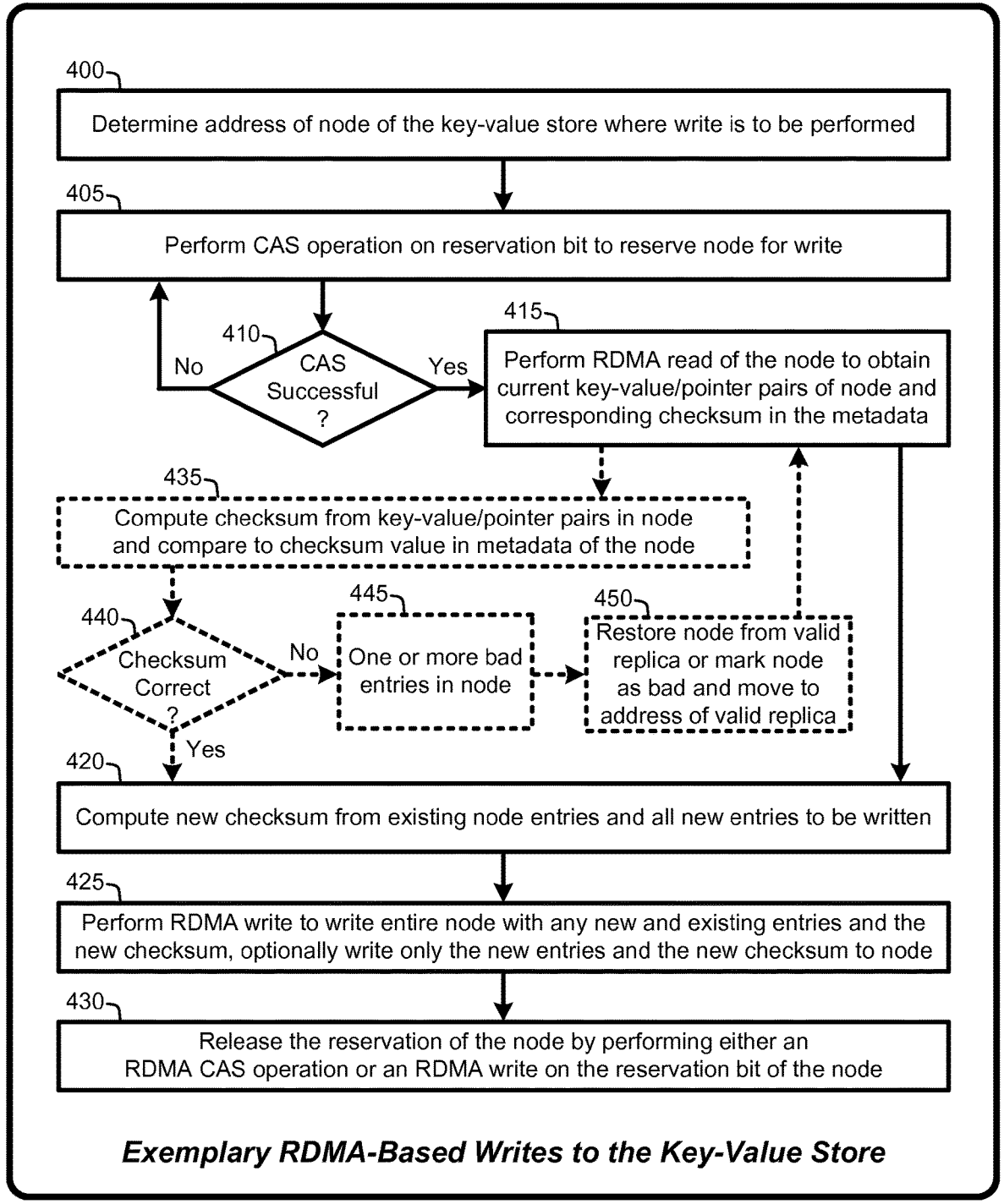
FIG. 4 provides a general flow diagram that illustrates various exemplary techniques for effecting RDMA-based writes to the B-Tree key-value store.

1.1 System Overview:

As mentioned above, the Key-Value Manager provides various techniques for applying RDMA messaging to provide a fast lock-free B-Tree based key-value store in shared memory distributed across multiple servers in an RDMA-based network. The processes summarized above are illustrated by the general system diagrams of FIG. 3 and FIG. 4. FIG. 3 illustrates RDMA-based reads of the key-value store. FIG. 4 illustrates RDMA-based writes to the key-value store.

The system diagram of FIG. 3 illustrates various implementations for performing RDMA-based reads of the key-value store. Furthermore, while the system diagram of FIG. 3 illustrates a high-level view of various implementations of the Key-Value Manager, FIG. 3 is not intended to provide an exhaustive or complete illustration of every possible implementation of the Key-Value Manager as described throughout this document. Advantageously, the RDMA-based reads of the key-value are self-directed, with the client managing its own reads regardless of where the memory hosting the node being read is stored within the RDMA-based network. Further, as mentioned previously, RDMA-based reads of the key-value store by any client are performed concurrently with self-directed RDMA-based reads, writes, and CAS operations on the key-value store by other clients, thereby enabling the key-value store to scale to very large numbers of concurrent client accesses while maintaining very low latencies for reads and writes to the key-value store.

For example, as illustrated by FIG. 3, in various implementations, the read process begins operation by obtaining (300) the address of the root node of a particular instance of the B-Tree based key-value store either by querying a known source (e.g., the aforementioned placement library or any other source) or in response to a publication of the address that is automatically pushed to each client. Next, the client performs an RDMA read (310) of the root node to obtain a reference to the address of the next node in the path containing the data value being sought by the client. The client can optionally cache the key-value/pointer pairs in the root node for performing future reads of branches below the root node.

Whenever the root node is read, the client computes (320) a checksum from the key-value/pointer pairs in the root node and compares (330) that computed checksum to the checksum value in the metadata portion of the node obtained during the read of the root node. The client then repeats the RDMA read (310) of the root node, if necessary, until such time as the computed checksum matches the checksum in the node metadata.

After reading the root node, the client then performs an RDMA read (340) of the next node in the path based on the address of that node obtained from the prior read. This read is performed to obtain a reference to the address of the next node in the path containing the data value being sought by the client. As with the read of the root node, the client again client computes (350) a checksum from the key-value/pointer pairs in the node being read and compares (360) that computed checksum to the checksum value in the metadata portion of that node. The client then repeats the RDMA read (340) of the node, if necessary, until such time as the computed checksum matches the checksum in the node metadata.

Once the checksum match is confirmed for the current node, a determination (370) is made as to whether the current node is a leaf node, thus indicating the bottom level of the tree. If the current node is a leaf node, the Key-Value Manager returns (380) the value or address being sought by the client in the leaf node to the client. Otherwise, if the node is not a leaf node, the client loops back and performs an RDMA read (340) of the next node in the path based on the address of that node obtained from the prior read. This process continues, with node reads, checksum comparisons and determination of node level as a branch or leaf node, until the leaf node is reached and the value or address being sought is returned to the client.

However, in various implementations, if the computed checksum does not match the checksum in the metadata after some predetermined number of read attempts, this may indicate that there are one or more bad or corrupt entries in the node, or simply that a memory error may have occurred for some reason. In this case, the Key-Value Manager then either restores the node from a valid replica (e.g., reserve the node on the primary, read the corresponding node from the valid replica and then write that data to the corresponding node of the primary followed by a release of the corresponding reservation bit) or marks that node as bad in the aforementioned placement library (see elements 277, 282 and 297 of FIG. 2) and then moves to the replica, now the primary, to perform the read process. Further, whenever any data is written to any node, that data is eventually replicated to each replica so insure consistency between the primary and each replica.

The system diagram of FIG. 4 illustrates various implementations for performing RDMA-based writes to the key-value store. Furthermore, while the system diagram of FIG. 4 illustrates a high-level view of various implementations of the Key-Value Manager, FIG. 4 is not intended to provide an exhaustive or complete illustration of every possible implementation of the Key-Value Manager as described throughout this document. In addition, any boxes and interconnections between boxes that may be represented by broken or dashed lines in FIG. 4 represent alternate implementations of the Key-Value Manager described herein. Further, any or all of these alternate implementations, as described herein, may be used in combination with other alternate implementations that are described throughout this document.

In general, as illustrated by FIG. 4, in various implementations, the write process begins operation by determining (400) the address of the node of the key-value store where the write is to be performed. This address may be obtained from some process or application that provides the address within a particular node where one or more key-value/pointer pairs are to be written, or by performing RDMA-based reads of the B-Tree (e.g., by applying the process illustrated with respect to FIG. 3) to obtain the appropriate address.

Once the address of the node to be written is determined, the Key-Value Manager then performs an RDMA CAS operation (405) on the aforementioned node reservation bitmap (e.g., see elements 277, 282 and 297 of FIG. 2) to flip the bit associated with that particular node to indicate that the node is reserved for writing. If the CAS operation is not successful (410), this means that the node is already reserved for writing by some other client. In this case, the client simply repeats the RDMA CAS operation (405) until such time that the CAS operation is successful, thereby reserving the node for writing by the client.

Following successful reservation of the node, the client performs an RDMA read (415) of the node to obtain the current key-value/pointer pairs of the node and the corresponding checksum in the metadata. Given one or more new key-value/pointer pair entries to be written to the node, the Key-Value Manager then computes (420) a new checksum from the combination of all of the existing key-value/pointer pairs in the node that are not being changed and all of the new key-value/pointer pairs that are being written. A single RDMA write (425) is then performed to write the entire node with all of the existing key-value/pointer pairs in the node that are not being changed and all of the new key-value/pointer pairs along with the new checksum in the metadata. Once this write is complete, the Key-Value Manager releases the reservation of the node by performing either an RDMA CAS operation or an RDMA write on the reservation bit associated with that node to flip the bit back to indicate that the node is no longer reserved.

In various implementations, whenever a node write is to be performed, the Key-Value Manager adds an optional error checking step to confirm validity of the data in the node prior to writing that node. In particular, as illustrated by FIG. 4, following the initial RDMA read (415) of the node, the Key-Value Manager computes (435) a checksum from the existing key-value/pointer pairs in the node. So long as the computed checksum matches (440) the checksum in the metadata, then the Key-Value Manager continues with step (420), as discussed above. However, if the computed checksum does not match the checksum in the metadata, this indicates (445) that there are one or more bad or corrupt entries in the node, or simply that a memory error may have occurred for some reason. In this case, the Key-Value Manager then either restores (450) the node from a valid replica and restarts the write process from step (415) or marks that node as bad in the aforementioned placement library (see element 295 of FIG. 2) and then moves to the replica, now the primary, and restarts the write process from step (415).

2.0 Operational Details of the Key-Value Manager

The above-described program modules are employed for enabling various implementations of the Key-Value Manager. As summarized above, the Key-Value Manager provides various techniques for applying RDMA messaging to provide a fast lock-free B-Tree based key-value store in shared memory distributed across multiple servers in an RDMA-based network. The following sections provide a detailed discussion of the operation of various implementations of the Key-Value Manager, and of exemplary methods for implementing the program modules and features described in Section 1 with respect to FIG. 1 through FIG. 4. In particular, the following sections provides examples and operational details of various implementations of the Key-Value Manager, including:

An operational overview of the Key-Value Manager;
RDMA messaging;
B-Tree based key-value store;
RDMA-based reads of the key-value store;
RDMA-based writes to the key-value store;
Optional RDMA-based memory allocations;
RDMA-based memory allocation considerations;
RDMA-based RPC messages for implementing the Key-Value Manager; and
Replicating nodes of the key-value store across multiple servers.

2.1 Operational Overview:

As mentioned above, the Key-Value Manager provides various techniques for applying RDMA messaging to provide a fast lock-free B-Tree based key-value store in shared memory distributed across multiple servers in an RDMA-based network. In other words, the memory holding the nodes (e.g., root, branches and leaf nodes) of the key-value store is distributed throughout multiple servers in the network. As a result, no one server is required to handle the load for large volumes of concurrent reads and writes to the key-value store, thereby reducing server load and latency for reads and writes to the key-value store. Therefore, otherwise heavy network traffic for key-value store accesses is mitigated by the distributed and self-directed nature of the key-value store. In various implementations, each node, regardless of node type, is of the same size that provides a small continuous buffer that may be fully read via a single RDMA read and written via a single RDMA write.

Advantageously, being lock-free improves overall performance of the key-value store by reducing latency associated with large numbers of concurrent reads and writes of the distributed memory of the B-Tree by multiple networked computers. Further, the ability of the messaging techniques described herein to use commodity RDMA-based NICs reduces networking costs relative to networks based on specialized NIC hardware. In addition, networks implemented using the Key-Value Manager are very flexible in that any server acting as a client (e.g., reading and writing to the key-value store and optionally requesting memory allocations) with respect to one or more other hosts (e.g. hosting some portion of the distributed shared memory of the key-value store) may concurrently be acting as a host with respect to one or more other clients. Further, the Key-Value Manager is easily scalable to multiple simultaneous, concurrent, or sequential requests from servers acting in either or both a client and a host capacity, thereby improving network performance.

In various implementations, the RDMA messaging capability of the Key-Value Manager is enabled by a connection library or the like that provides an application programming interface (API) for use of RDMA-based messaging via the RDMA-enabled NICs of each server. This connection library encapsulates various protocols to both establish and maintain connections between the NICs of any number of networked computers. Any application or process running on any server may access the API to interface with the Key-Value Manager to perform reads and writes on the key-value store. The API will then automatically initiate communication between servers via RDMA-enabled NICs to process the read and write requests.

For example, the Key-Value Manager provides various API's that enable any client to create a key-value store and to read, write, and optionally delete records in the key value store. Reads enabled by the Key-Value Manager provide transactional "Get" operations that are performed via a sequence of RDMA reads and checksum comparisons of the key-value store. Writes enabled by the Key-Value Manager provide transactional "Put" operations that are performed via a sequence of RDMA reads, RDMA writes, and RDMA CAS operations. Similarly, optional deletes enabled by the Key-Value Manager provide transactional "Delete" operations that are performed via a sequence of RDMA reads, RDMA writes, and RDMA CAS operations to delete the mapping of a specified key.

The use of RDMA-enabled NICs to process the read and write requests enables the Key-Value Manager to apply "kernel bypass" techniques that further reduce CPU load on the server for accesses to the key-value store. Kernel bypass is a concept that is applied to improve network performance by carrying out various operations and memory reads and writes without access or notification to the kernel. For example, in a typical networking scenario, the kernel decodes network packets, e.g., TCP, and passes the data from the kernel space to "user space" by copying it. The term "user space" refers to code which runs outside the kernel (e.g., outside kernel space). User space typically refers to various programs and libraries that the OS uses to interact with the kernel, such as, for example, software that performs input/output, manipulates file system objects, application software etc. The copy process from kernel space to user space typically involves saving user space process context data and then loading kernel context data. This step of saving the user space process context data and then loading the kernel process information is typically referred to as context switch. However, application context switching has been observed to constitute a large fraction of network overhead, thereby reducing bandwidth and latency performance of computer interconnects.

The Key-Value Manager adapts various kernel bypass techniques to enable user space applications to communicate with the Key-Value Manager, which is adapted to communicate both with user space applications and the NIC on the computing device on which the Key-Value Manager is executing. This process takes the kernel out of the path of communication between the user space process and an I/O subsystem enabled by the Key-Value Manager that handles network communication via the RDMA enabled NICs. Advantageously, this configuration eliminates context switching and copies from kernel space to user space. For example, in various implementations, the Key-Value Manager generally transmits RDMA reads, writes, and CAS operations via the following order of user space operations:

1. Make a determination on a local server acting as a client that an RDMA message is to be transmitted to a remote server acting as a host of some portion of the shared distributed memory. In general, this determination is made in response request to read or write to the key-value store received or otherwise intercepted by the Key-Value Manager;
2. Apply a local instance of the Key-Value Manager on the client to communicate with the NIC of the client;
3. Apply the NIC of the client to communicate with physical networking hardware (e.g., RDMA-enabled switches, routers, etc.) of the network to send the appropriate RDMA message (e.g., reads, writes and CAS operations) across the network to the NIC of the host (e.g., the computer hosting the node of the key-value store being read or written); and
4. In response to receipt of the RDMA message by the NIC of the host, applying the NIC of the host to perform the requested read, write, or CAS operation on memory of the host via DMA operations between that NIC and the memory on that host. In other words, each server performs local DMA operations (e.g., reads, writes, and CAS operations) in response to RDMA messages received by the NIC from other servers.

For example, in various implementations, an application, process, or thread executing on one of the networked clients instructs that client to perform a read or write on the key-value store. In various implementations, the Key-Value Manager receives or otherwise intercepts that read or write request and performs a sequence of RDMA reads (for reads of the key-value store) or a sequence of RDMA reads, CAS operations and writes (for writes of the key-value store).

Advantageously, the actual process, thread, or application making the read or write request may not necessarily be aware of, or care, that the distributed memory hosting the key-value store exists on a different server (or multiple servers) in the network. That process, thread, or application simply makes use of the memory references obtained from nodes of the key-value store to read or write to that memory via the Key-Value Manager. In other words, various combinations of RDMA reads, writes and CAS operations are used in combination with references to the address of particular nodes to read and/or write to those nodes of the key-value store. As such, the Key-Value Manager provides these networked servers with fast lock-free access to a key-value store distributed within a significantly larger shared memory space (across multiple servers) than would be possible by accessing only local server memory.

2.2 RDMA Messaging:

Remote direct memory access (RDMA) is a direct memory access from the memory of one computer into the memory of a different computer that is performed via the RDMA-enabled network interface controllers (NICs) of those computers without involving the operating system of either computer. In other words, all of the RDMA operations are performed directly by the NICs reading and writing to server memory without any interruption or notification to the CPU of either server. More specifically, the client NIC sends an RDMA message or request to the NIC of the host. Any host receiving an RDMA message or request then applies its own NIC to interact with its own local memory via corresponding local direct memory access (DMA) operations between the NIC of the host and the memory of the host to service the received RDMA request. However, for purposes of explanation, the following discussion will simply refer to the use of RDMA messages or requests sent by the client to the host to apply RDMA messaging to provide a fast lock-free B-Tree based key-value store in shared memory distributed across multiple servers in an RDMA-based network.

In various implementations, the Key-Value Manager makes use of various RDMA verbs to enable the key-value store in distributed memory and to provide optional RDMA-based allocations of the distributed memory for construction and growth of the key-value store. For example, in various implementations, these RDMA verbs include, but are not limited to, various sequences of RDMA writes, RDMA reads, and RDMA atomic compare and swap (CAS) operations.

Further, a remote procedure call (RPC) is an inter-process communication that allows a computer program, process, or thread running on one computer to cause a subroutine or procedure to execute in an address space of a different computer on a shared network. Typically, to execute an RPC, a client computer sends an RPC request to a server computer. The RPC request includes an ID of a particular procedure (e.g., a subroutine, application, process, etc.) to be executed by the server and one or more optional parameters to be used for execution of that procedure. In various implementations, a "cookie" or the like may also be sent along with the ID. In general, this cookie is an identifier (e.g., number, name, etc.) that uniquely identifies the client/sender in a way that enables the original message sent by the client to be matched to the response that is eventually received by the client.

As mentioned above, in various implementations, the Key-Value Manager performs reads and writes on the key-value store, and optional memory allocations for the key-value store, using RDMA-based messaging. As such, these memory allocations and accesses to the key-value store are performed without involving the CPU of the client or the host. However, in various implementations, the Key-Value Manager combines RDMA messaging and remote procedure call (RPC) requests to perform reads and writes on the key-value store, and optional memory allocations for the key-value store. In such cases, the CPUs of the client and host servers only become involved when they access to the key-value store or execute a memory allocation request specified by an RPC request transmitted between the client and the host servers via RPC requests sent via RDMA-based messaging.

In various implementations, the Key-Value Manager assumes a protected network where all servers have appropriate permissions to access one or more reserved regions of shared memory of other computers for reading and writing to the key-value store. Otherwise, an additional permission step is performed prior to performing RDMA operations to ensure that the host provides appropriate permissions to particular clients to allow the client to access its memory. Assuming such permission is in place, memory accesses are conducted via messaging between the NICs of the client and the host with no notification whatsoever to the operating system of the host.

RDMA reads enable the client to read a section of memory of the host via the RDMA NICs of the client and the host. In other words, the RDMA read message enables the client to read memory of the host (e.g., a node of the key-value store) without the operating system of the host being aware of that memory read. Similarly, RDMA writes enable the client to write to a section of memory of the host (e.g., a node of the key-value store) via the RDMA NICs of the sender and the host. As with RDMA reads, RDMA write operations are performed with no notification to the host.

The RDMA atomic compare and swap (CAS) operation is used to atomically compare a value in the RDMA CAS message from the client to a value of a specified virtual address of the host. If the compared values are equal, a value specified by the RDMA CAS message will be stored at the virtual address of the host. In other words, in an atomic transaction, a series of database operations either all occur, or nothing occurs. A guarantee of atomicity prevents updates to the memory address occurring only partially. Consequently, the RDMA transaction is not observed to be in progress by the host because at one moment in time, it has not yet happened, and at the next moment, it has already occurred in whole (or nothing happened if the transaction failed due to a mismatch of the sent value and the value held by the host).

In various implementations, the Key-Value Manager applies RDMA CAS operations, in combination with meta-data obtained via RDMA reads of the key-value store, to reserve particular nodes prior to performing RDMA writes to the key-value store, and to optionally allocate particular memory blocks and memory slabs for use by the key-value store by modifying metadata block headers and free slab maps of the allocated memory via RDMA CAS operations on those block headers and free slab maps, as discussed in further detail in the following paragraphs.

2.3 B-Tree Based Key-Value Store:

In general, a B-Tree is a structure used to construct a key-value store that points a client down to a memory location of a data value by traversing from a root node of the B-Tree via a tree-based sequence of references to that data value in a leaf node of the tree. In other words, a path through multiple branches from the root node of the tree are sequentially traversed to reach a leaf node that contains a reference to the data value being sought by the client. Each leaf node of the tree is comprised of multiple entries with each entry including a key-value/pointer pair to the data being sought by the client. The root node and each branch node is comprised of multiple entries (e.g., a key range), which are key-value/pointer pairs to the next lower sub-branch which are traversed to reach leaf nodes.

More specifically, in a typical B-Tree, each node of the B-Tree contains keys and pointers to lower nodes (e.g., key-value/pointer pairs). The keys act as separation values which divide its subtrees (e.g., further branch nodes or leaf nodes) while the corresponding pointer provides a reference to the memory of the next lower node. For example, if an internal branch node has 3 child nodes then that internal node will 2 keys: $k_1$ and $k_2$ (e.g., 5 and 10, respectively). The values in the leftmost subtree will be less than $k_1$ (e.g., values 1, 2, 3 are less than key value of 5), the values in the middle subtree will be between $k_1$ and $k_2$ (e.g., 6, 8, and 9 are between key values 5 and 10), and the values in the rightmost subtree will be greater than $k_2$ (e.g., 15 and 356 are greater than key value 10). The leaves hold either the data record being sought via the B-Tree read or, alternately, the leaves hold pointers to the memory holding the data record.

The Key-Value Manager improves performance of reads and writes to the key-value store by distributing the memory hosting the key-value store across multiple networked servers. Further, the Key-Value Manager enables self-directed reads and writes to the key-value store. As such, scalability of the B-Tree based key-value store enabled by the Key-Value Manager is improved by avoiding the use of a central computer to coordinate or control those reads and writes. In addition, the Key-Value Manager provides a meta-data based mechanism to ensure that the key-value store maintains consistency for reads and writes without the requirement to perform significant amounts of locking.

In various implementations, the Key-Value Manager provides a growth-only structure for the key-value store. In other words, in the growth-only scenario, once memory is allocated for a new branch or leaf node of the B-Tree, that memory remains allocated (and available for future reads and writes), even if the data in that node has been deleted. Further, in the growth-only scenario, the key-value/pointer pairs in any particular node remain pointing to the same child node. In other words, in the growth-only case, nodes are added or appended to the tree but not removed from the tree. Further, when growing the tree, leaf nodes may be converted into branch nodes, with appropriate key-value/pointer pairs, to include additional lower levels of the tree.

Alternately, in various implementations, rather than provide a growth-only configuration of the key-value store, the Key-Value Manager allows nodes to be pruned or deleted from the B-Tree. Further, branches may be converted to leaves based on pruning of lower levels of the tree. Similarly, leaf nodes may be converted into branches when adding new child nodes to the tree. However, in this non growth-only scenario, it is possible that any particular parent or child node may contain stale data (e.g., invalid key-value/ pointer pairs) due to an intervening write operation or a prior node add or delete operation subsequent to the read of the parent node and prior to the read of the corresponding child node.

Consequently, to address such issues in the non growth-only case, in various implementations, the metadata of each node further includes a reverse pointer to the parent node (i.e., the higher-level node that immediately precedes and contains a key-value/pointer pair to a particular lower-level node (i.e., the child node) in the key-value store). These reverse pointers enable the Key-Value Manager to validate that as it is traversing the tree it does not jump to an incorrect branch or leaf node due to any combination of node write and prior deletes and adds of nodes. In particular, while traversing the tree for the purpose of reading a particular key-value/pointer pair, the Key-Value Manager compares the reverse pointer read from the metadata of any child node to the address of the parent node from which the child node was reached. In the event that the reverse pointer in the child node does not match the address of the parent node from which that child node was reached, it is possible that an intervening node add or delete operation and/or a node write operation on the child and/or parent nodes may have occurred subsequent to the read of the parent node and prior to the read of the child node. As such, the key-value/pointer pair originally read from the parent node may be stale.

In the event that the reverse pointer does not match the address of the parent node, the Key-Value Manager repeats the read of the parent node and compares the key-value/ pointer pair of that new read to the prior read. If the new and old key-value/pointer pairs of the parent node are different, this indicates that the parent has been updated via a new node write operation. In this case, the Key-Value Manager continues traversing the tree using the new key-value/ pointer pair of the parent obtained by the new read of the parent, while continuing to compare the reverse pointers, as described above.

However, if the new and old key-value/pointer pairs of the parent node are the same between the new read to the prior read, this indicates that the parent may hold stale data. In this case, the Key-Value Manager bubbles up one level (i.e., to the immediate parent of the current parent node) and performs a new read of the immediate parent node. The Key-Value Manager then compares the key-value/pointer pair of that new read of the immediate parent node to the prior read of the immediate parent node. If the new and old key-value/pointer pairs of the immediate parent node are different, this indicates that the immediate parent has been updated via a new node write operation. In this case, the Key-Value Manager continues traversing the tree using the new key-value/pointer pair of the immediate parent obtained by the new read of the immediate parent while continuing to compare the reverse pointers, as described above. Otherwise, if the new and old key-value/pointer pairs of the immediate parent node are the same, the Key-Value Manager iteratively bubbles up to next higher parents until a level of the tree is reached where the new and old key-value/ pointer pairs of the next higher parent node is different, at which point the Key-Value Manager continues traversing the tree given the new key-value/pointer pair of that next higher parent node, while continuing to compare the reverse pointers, as described above.

In various implementations, nodes of the key-value store enabled by the Key-Value Manager have a fixed size that is less than or equal to the maximum frame size enabled by the RDMA-enabled NIC hardware in the network. This enables the entire node to be read or written via a single RDMA read or write. For example, in a tested implementation, nodes were configured using fixed sized memory slabs allocated by any desired memory allocation process, or by an optional RDMA-based memory allocator component of the Key-Value Manager. For example, when using the RDMA-based memory allocator, slab sizes were set anywhere between one byte and the maximum RDMA read size, with intermediate sizes of increasing powers of 2 (e.g., 2 bytes, 4 bytes, 8 bytes, 16 bytes, 32 bytes, 64 bytes, 128 bytes, 256 bytes, etc.). However, the Key-Value Manager is operable with any desired memory allocation process, and the RDMA-based memory allocator component is described herein only for purposes of explanation and example.

Each B-Tree has a publicized name (e.g., a "friendly name") by which the client first finds the appropriate key-value store. For example, in various implementations, the client contacts a known address (which may have multiple backups for redundancy), and provides the friendly name of a particular B-Tree to a process that returns a memory reference to the root node of the corresponding B-Tree. The client then reads that memory address to obtain a list of branches of the root node. In various implementations, once a client receives the memory address for a particular B-Tree, the client maintains that address in order to perform future B-Tree reads or writes of the key-value store. In other words, any client only needs to obtain the address of the root node of a particular B-Tree one time, and can then maintain a copy of that address for further interactions with that B-Tree.

Optionally, in various implementations, the root node of each B-Tree is propagated to each client whenever any B-Tree is created on any server. This eliminates the initial RDMA read of the root node of each B-Tree by individual clients to provide a small performance improvement. However, given the very large number of interactions between clients and particular B-Trees, elimination of a single RDMA read of the root node by the client doesn't significantly reduce overall system latency.

2.3.1 Initializing the Key-Value Store:

When the Key-Value Manager initially creates a particular key-value store, a friendly name is associated with that key-value store and provided to the aforementioned placement library along with the address of the root node of that particular key-value store. The root of that key-value store is stored in a secure memory location that is available in a placement library or the like, and that is published (or provided on request) to each of the clients based on the friendly name associated with the key-value store. The friendly name (e.g., "Database 1") is simply an easy way for a client to reference a particular key-value store. Typically, but not necessarily, the friendly name is specified by the client requesting creation of the key-value store.

Further, when the Key-Value Manager first creates any key-value store, the Key-Value Manager initially allocates memory for one root node, and additional memory for a full set of empty leaf nodes. In addition, when the key-value store is first created, the Key-Value Manager populates key-value/pointer pairs in the root node to point to the allocated addresses of each of the corresponding leaf nodes.

The number of the leaf nodes for the root node (or any other branch node) is set at some specified value. Typically, the depth of the tree (i.e., number of levels) increases in inverse proportion to the number of branch and leaf nodes addressable from the root or other branch node. In other words, wide trees (more branches or leaves from each node) tend to have fewer levels than narrow trees. This root branch can be cached on any client since it is unlikely to change, especially in instances where the key-value store is set up in a growth-only configuration, as discussed in further detail in Section 2.3.3.

2.3.2 Splitting or Updating Nodes:

In general, as the key-value store grows, existing leaf nodes are converted to branch nodes to expand the B-Tree downwards with additional levels. When converting a leaf node to a branch node, new entries are first added to the reservation bitmap for each of the new leaf nodes that depend from the node being converted to a branch. In addition, the reservation bits for each of the new leaf nodes and the node being converted to a branch are all flipped to reserve those nodes until node write operations on all of those nodes are completed to write the appropriate key-value/pointer pairs to those nodes. These reservations are then released after the conversion process is complete so that reads and writes of the converted node and the new leaf nodes may be performed, as described herein.

Conversely, when deleting data from a particular leaf node, that leaf node may no longer hold any key-value pairs that point to any data. In this case, the leaf node may be maintained with null data that may be populated with key-value/pointers at some point via RDMA-based writes. Alternately, in some cases, the leaf node is pruned from the B-Tree by converting the parent branch node into a leaf node. As with conversion from a leaf to a branch node, whenever a node is converted from a branch to a leaf node, all of the affected nodes are reserved by flipping the corresponding bits of the reservation bitmap until the conversion process is complete via writes of new key-value/pointer pairs to the node being converted to a leaf node.

For example, when expanding the tree, the tree grows by converting one or more leaf nodes to branches and allocating memory for new leaf nodes below the newly converted branch. Whenever a leaf node is converted to a branch, the Key-Value Manager will perform an RDMA write, using the node writing techniques described herein, to populate the converted branch with key-value/pointer pairs to reference the new leaf nodes in the newly allocated memory. In other words, the Key-Value Manager allocates additional memory, on one or more servers in the network, for a new full set of empty leaf nodes, and will write new key-value/pointer pairs to the newly converted branch node to point to the newly allocated addresses of each of the corresponding leaf nodes. In addition, some of the original key-value/pointer pairs in the node that was converted from a branch to a leaf node may be written to the newly allocated leaf node.

As such, these techniques enable caching of nodes without needing to validate the cache. For example, in various implementations, when a branch is divided into key-value/pointer pair entries (e.g., branch contains keys 1 to 1000), that branch is never recreated. In particular, when a branch is created, the key-value/pointer pair entries are initialized as null pointers. As such, in various implementations, the Key-Value Manager does not pre-allocate branches for future use, thereby saving a large amount of memory space. Then, once a null pointer needs to be converted into a real branch (with actual data) the Key-Value Manager performs the allocation on demand and enables writes to the newly allocated memory using the RDMA-based write techniques described herein. For example, when the key-value store is initially created, the root node is divided into some number of branches. These branches are then filled as writes are performed, and new branches (e.g., conversion of leaf nodes to branches) are allocated and filled with data on an as-needed basis.

2.3.3 Optimizations for the Growth-Only Scenario:

In various implementations, efficiency of read and write accesses to the key-value store are improved by the Key-Value Manager via a growth-only scenario. In other words once memory is allocated for the key-value store that memory remains allocated, even if one or more branch or leaf nodes are logically pruned from the B-Tree. As such, from the client point of view, particular key-value/pointer pairs may be logically deleted, or entire branch or leaf nodes may be logically deleted without shrinking the tree. However, the space for that particular key or node is then available for new writes because that same allocated memory is reused whenever a new key or node is needed. Thus, once memory is allocated for the tree, it stays allocated for that tree, regardless of whether that memory holds any data.

For example, consider an example of applying the Key-Value Manager to construct and provide access to a key-value store for customer purchase history. Any time that a customer makes a transaction (e.g., on a store website, in a physical store, etc.), a corresponding entry can be added to the key-value store. In the growth-only case, transactions are then never undone, even if the customer returns a purchase. The return is simply treated as an additional refund transaction. As such, optimizing the Key-Value Manager using a growth-only implementation provides real-world efficiency improvements.

2.4 RDMA-Based Reads of the Key-Value Store:

In various implementations, reads on the key-value store begin by obtaining the address of the root node of a particular instance of the B-Tree based key-value store either by querying a known source (e.g., the aforementioned placement library or any other known source) or in response to a publication of the address of the root node that is automatically pushed to each client. In other words, the client either already has the address of root node, or obtains that address by reading a list or set of friendly names that are mapped to addresses of root nodes of corresponding key-value stores. All of the read operations on the key-value store are then performed by the client using RDMA to perform one-way reads. Further, based on a write reservation size (see discussion of reservation considerations in Section 2.5.1) multiple clients may read the same node concurrently while any number of clients are concurrently performing writes to any other nodes.

In particular, given the address of the root node, the client performs an RDMA read of the root node to obtain a reference to the address of the next node in the path containing the data value being sought by the client. The client can optionally cache the key-value/pointer pairs in the root node for performing future reads of branches below the root node. For example, the root node typically has many branches, and each branch has a range of numbers (e.g., keys 1-1000, 1001-2000, etc.). The client picks whatever branch it is interested in, performs another RDMA read of whatever sub-branch it is interested in, and repeats until it reaches the appropriate leaf node. In other words, the client performs an RDMA read of root node to obtain addresses of each sub-branch (i.e., internal node) the root node. The client then performs RDMA reads of progressively lower or deeper internal nodes to traverse the B-Tree until the appropriate leaf node is reached to read the data of that leaf node (e.g., a final pointer or reference to the value being sought by the client).

Whenever any node is read, the client computes a checksum value from the key-value/pointer pairs in the node and compares the computed checksum to a checksum in the metadata portion of the node. For example, the read process begins by with an RDMA read of the root node (unless the root node is already locally cached). The client then computes a checksum from the key-value/pointer pairs in the root node and compares that computed checksum to the checksum value in the metadata portion of the node obtained during the RDMA read of the root node. The client then repeats the RDMA read of the root node, if necessary, until such time as the computed checksum matches the checksum in the node metadata.

After a successful read the root node (e.g., matching checksums), the client then performs an RDMA read of the next node in the path based on the address of that node obtained from the prior read. This read is performed to obtain a reference to the address of the next node in the path containing the data value being sought by the client. As with the read of the root node, the client again client computes a checksum from the key-value/pointer pairs in the node being read and compares that computed checksum to the checksum value in the metadata portion of that node. The client then repeats the RDMA read of the node, if necessary, until such time as the computed checksum matches the checksum in the node metadata.

Once the checksum match is confirmed for the current node, a determination is made as to whether the current node is a leaf node, thus indicating the bottom level of the tree. If the current node is a leaf node, the Key-Value Manager returns the value or address being sought by the client in the leaf node to the client. Otherwise, if the node is not a leaf node, the client loops back and performs an RDMA read of the next node in the path based on the address of that node obtained from the prior read. This process continues, with node reads, checksum comparisons and determination of node level as a branch or leaf node, until the leaf node is reached and the value or address being sought is returned to the client.

In cases where there is a large volume of writes to a particular node, or simply overlapping timing of reads and writes to the node, the checksum of the node may not match the checksum computed by the client until any particular write has been completed (see discussion of RDMA-based writes in Section 2.5). Consequently, in various implementations, system overhead is reduced by checking the reservation bit of the node via an RDMA read prior to performing node reads and the subsequent computation and comparisons of checksums. In such implementations, the RDMA reads of the reservation bitmap are repeated until the particular reservation bit of the node shows the node as being free, at which time the node is read via an RDMA read.

2.5 RDMA-Based Writes to the Key-Value Store:

Whenever any client wants to write to a particular node, the client first reserves that node. Once a node has been successfully reserved, only the reserving client can write to that node until the reservation is released. As such, this reservation ensures that there will not be any write collisions where two or more clients are attempting concurrent writes to the same node. In general the reservation is for the entire node that is being written. However, as discussed in further detail below, larger reservations for entire branches and smaller reservations for individual entries in a node are also enabled by various implementations of the Key-Value Manager.

In various implementations, the write process begins operation by determining the address of the node of the key-value store where the write is to be performed. This address may be obtained from some process or application that provides the address within a particular node where one or more key-value/pointer pairs are to be written, or by performing RDMA-based reads of the B-Tree to obtain the appropriate address. For example, each key-value/pointer pair in the root node provides a mapping table to a separate child node (e.g., a branch or leaf node, depending on the depth of the tree). Therefore, by selecting a particular key-range from the root node, then sequentially reading child node addresses from the distributed memory of the key-value store, the Key-Value Manager traverses the tree to a leaf node where it performs an RDMA write to insert the key and address of the new value (i.e., a key-value/pointer pair) into the mapping table provided by the key-value store.

These RDMA-based writes are protected to ensure consistency of the key-value store. For example, given the address of the node to be written, the Key-Value Manager performs an RDMA CAS operation on the aforementioned node reservation bitmap to flip the bit associated with that particular node to indicate that the node is reserved for writing (e.g., "0" if free, or "1" if reserved). If the CAS operation is not successful, this means that the node is already reserved for writing by some other client. In this case, the client simply repeats the RDMA CAS operation until such time that the CAS operation is successful, thereby reserving the node for writing by the client.

Following successful reservation of the node, the client performs an RDMA read of the node to obtain the current key-value/pointer pairs of the node and, optionally, the corresponding checksum in the metadata. Given one or more new key-value/pointer pair entries to be written to the node, the Key-Value Manager then computes a new checksum from the combination of all of the existing key-value/pointer pairs in the node that are not being changed and all of the new key-value/pointer pairs that are being written. The entire node may be written as a single RDMA-based write operation. As such, one or more of the entries in any node can be replaced by a single RDMA write. In other words, a single RDMA write is performed to write the entire node with all of the existing key-value/pointer pairs in the node that are not being changed and all of the new key-value/pointer pairs along with the new checksum in the metadata. Once this write is complete, the Key-Value Manager releases the reservation of the node by performing either an RDMA CAS operation or an RDMA write on the reservation bit associated with that node to flip the bit back to indicate that the node is no longer reserved.

In various implementations, whenever a node write is to be performed, the Key-Value Manager adds an optional error checking step to confirm node integrity prior to writing that node. For example, following the initial RDMA read of the node, the Key-Value Manager computes a checksum from the existing key-value/pointer pairs in the node. So long as the computed checksum matches the original checksum in the metadata, then the Key-Value Manager continues with the write operation, including the new checksum, as discussed above. However, if the computed checksum does not match the checksum in the metadata, this indicates that there are one or more bad or corrupt entries in the node, or simply that a memory error may have occurred for some reason. In this case, the Key-Value Manager either restores the node from a valid replica and restarts the write process or marks that node as bad in the aforementioned placement library and then moves to the replica, now the primary, and restarts the write process.

2.5.1 Reservation Considerations:

In general, the Key-Value Manager reserves the entire node being written. However, in various implementations, depending on the particular use and traffic profile for a particular key-value store, the Key-Value Manager can be configured to reserve a larger path consisting of multiple nodes. However, read and write efficiency is generally improved by reserving only the node being written. Further, in various implementations, the Key-Value Manger can be configured to reserve individual elements or entries of the node being written so that multiple users can perform concurrent writes to the same node. In this case, rather than providing a checksum over the entire node, individual checksums would be used for each element of the node. In other words, the checksum is on the maximum reservation size. So, in order to reserve smaller elements than an entire node, there will be more checksums. This configuration may provide performance improvements depending on the particular workload and traffic patterns.

In other words, depending on the workload and network traffic, the Key-Value Manager can be configured to reserve: 1) an entire branch and all sub-branches and leaf nodes, anywhere from the root node down; 2) an entire node; or 3) a single element of a single node. In each case, the checksum corresponds to the particular level of reservation. However, given the relatively small size of the individual nodes, RDMA-based writes to the individual elements of nodes doesn't take much more time, if any, than to write the entire node. So, in terms of latency, there isn't typically much of a benefit to reserving individual node elements over reserving the entire node. However, whether or not a latency benefit is observed will depend on the particular workload (e.g., how many concurrent writes to a particular leaf node are being performed). For example, if there is approximately evenly distributed high contention across the individual elements of the node, providing reservations for those individual elements would typically reduce overall system latency relative to reservation of the entire node.

2.5.2 Addressing Potential Write Failure Cases:

As with any computing system, various failures may occur during write operations by any client to any node of the key-value store. For example, following reservation of a particular node and prior to performing a successful write, the client performing the write may go offline for some reason and thus be unable to remove the reservation bit or flag for that node. Similarly, following reservation of a particular node and successful write to that node, the client performing the write may go offline for some reason and thus be unable to remove the reservation bit or flag for that node. Advantageously, in either case, the checksum of that node will be correct if either the write has not been performed at all or if the write has been completed without clearing the reservation bit. As such, whether or not the write is performed following the reservation, the checksum will indicate whether the data in the node is valid.

Consequently, to address the issue of a node reservation that is not released for any reason, in various implementations, the Key-Value Manager assumes that the key-value store is operating properly but also puts a maximum bound (e.g., time t) on the length of time that any particular node can be reserved. For example, consider the scenario of server A wanting to write to node n (hosted on server B) which is reserved via the reservation bitmap, while server C that originally reserved node n goes offline for some reason either before or after writing to node n, but prior to releasing the reservation. In this scenario, server A will wait a predetermined amount of time t for the reservation to be released. If the reservation is then not released following expiration of that time period, server A sends an RPC message to server B to inform server B that the memory it is hosting for node n has been reserved for too long asking for that reservation to be released. Assuming that the reservation bitmap for node n is locally hosted by server B, server B can then flip the reservation bit, via an internal DMA CAS operation to release the reservation for node n. Alternatively the Key-Value Manager can acquire all reservations via sending an RPC message to the server hosting the memory in question and then the host machine can release the reservations following the timeout period.

Further, in the case that some sort of memory corruption has occurred in a node for any reason, the metadata checksum will no longer match the computed checksum, thereby indicating incorrect, erroneous, or otherwise corrupted data in the node. In this case, as noted above, the Key-Value Manager can either restore the corrupted node from a valid replica of that node, or mark that node as bad and then move to a valid replica for future reads and writes.

2.6 Optional RDMA-Based Memory Allocations:

Memory holding the key-value store is managed and distributed across multiple computing devices using any desired memory management technique. However, in various implementations, this memory is managed by an optional RDMA-based memory allocator component of the Key-Value Manager (e.g., see FIG. 2, RDMA-Based Memory Allocator API Module (285, 290), and FIGS. 5 and 6, discussed below). The following paragraphs describe this optional RDMA-based memory allocation process.

In general, multiple servers in the network host one or more memory regions of the shared distributed memory that is reserved for use by the Key-Value Manager. Reserving these memory regions for use by the Key-Value Manager ensures that servers in the network, or other processes executing on those servers, do not write to memory regions of the reserved memory except via the Key-Value Manager, thereby avoiding conflicts or corruption of memory managed by the Key-Value Manager. The reserved memory on any particular server is then only accessed by the Key-Value Manager via DMA read, write, and CAS operations on that memory by the NIC of that server in response to RDMA messages received by the NIC of the server for the purposes of reads and writes on the key-value store.

In general, each memory region is defined as a contiguous section of memory that is reserved for use by the Key-Value Manager. In various implementations, a memory region size of 2 GB was used, with one or more of these regions being reserved on any of the networked servers. However, memory regions of any desired size may be used based on the techniques described herein. These reserved memory regions are directly addressable (via DMA operations) by RDMA-enabled NICs in response to RDMA reads, writes and CAS operations transmitted and received by the RDMA-enabled NICs of each server.

Further, each individual memory region contains a section of memory (e.g., one or more memory blocks) reserved for metadata in the form of block headers and a free slab map. In various implementations, the size of block header regions and the size of the free slab maps may be the same sizes as the blocks into which each region is divided. However, there is no requirement that block headers be the same size as free slap maps, or that either of these are the same sizes as the blocks in the same memory region. In addition, depending on memory region size and the amount of metadata in block headers and free slab maps, multiple block header sections and multiple free slab maps may be included in any particular memory region.

In various implementations, the metadata of the block headers comprises information including, but not limited to, an indication of whether each block in a particular memory region is free or allocated, slab sizes for each allocated block, and a count of the number of allocated slabs (or a count of the number of free slabs) in each allocated block of the memory region. In various implementations, the metadata in these block headers also contains locally hosted instances of the aforementioned reservation bitmaps for the nodes of the B-Tree, where each individual node may correspond to a particular slab in a particular block of the memory region. However, the reservation bitmap may optionally be hosted in any allocated memory and need not be included in the metadata of the block headers. The free slab map comprises metadata including, but not limited to, a bitmap or other metadata, indicating whether each individual slab in each of the memory blocks of a particular memory region are free or allocated (e.g., "0" if free, or "1" if used or allocated for any particular slab).

In various implementations, the remainder of each memory region (other than the metadata sections) is divided into equal sized blocks by block allocators of the RDMA-Based Memory Allocator API. However, the block size in different memory regions may be different from that of other memory regions, depending on system configuration. Similarly, in various implementations, each memory block is divided into equal sized memory slabs by slab allocators of the RDMA-Based Memory Allocator API. However, the slab size in different blocks may be different from that of other blocks, depending on system configuration.

In general, the block allocator component of the RDMA-Based Memory Allocator API reserves two or more of the first blocks in its memory region for metadata. The first group of blocks, which are at least one block, contain all of the block headers for the entire memory region. These block headers contain all the shared information needed to perform lock-free operations in the allocator. The next group of blocks is the free slab map for all of the allocatable blocks in the memory region. The amount of blocks used for this metadata is based on the number of blocks, block size and the maximum number of slabs in a block. In other words, memory blocks are allocated from the memory region by block allocator components of the RDMA-Based Memory Allocator API.

Each block allocator is responsible for allocating blocks from within a particular region. The block allocator is also responsible for setting a block's size and marking a block as un-used (via the block header associated with that block) when there are no more used slabs in a block. In various implementations, the block allocator applies a "best fit" allocation strategy to find space in the next appropriately sized slab and/or block. This results in a trade-off between an increase in internal fragmentation and latency of the system.

These block allocators are instantiated as needed by the RDMA-Based Memory Allocator API and set the size of the blocks being allocated from the memory region. In various implementations, block size was set to 1 MB. However, there is no requirement that blocks be any particular size, and as such, block size can be any desired size up to the entire size of the memory region (less the portion of the memory region reserved for metadata).

Similarly, memory slabs are allocated from memory blocks by slab allocator components of the RDMA-Based Memory Allocator API. These slab allocators are instantiated as needed by any block allocator associated with a particular memory region. In general, slabs are the smallest unit in the allocator and it is the actual individual allocation unit that any client can allocate for memory reads and writes.

As mentioned above, the size of slabs may differ between different blocks, but is typically the same size within individual blocks.

For example, in various implementations, possible slab sizes are set anywhere between one byte and one megabyte (or whatever the maximum block size has been set to, with intermediate sizes of increasing powers of 2 (e.g., 2 bytes, 4 bytes, 8 bytes, 16 bytes, 32 bytes, 64 bytes, 128 bytes, 256 bytes, etc.). Allocating the same size slabs within individual blocks makes it a simple matter to compute references to allocated slabs by simply determining an offset based on the slab count in the block. However, by including additional metadata in either the free slab map or the block header to allow determination of references to reserved slabs, the slabs can be set at any desired size within blocks. Further, in various implementations, slab size was set at a value equal or less than the maximum write size of a single RDMA write. This enables entire nodes (comprising a single slab) to be written in a single RDMA write.

Figure 5:
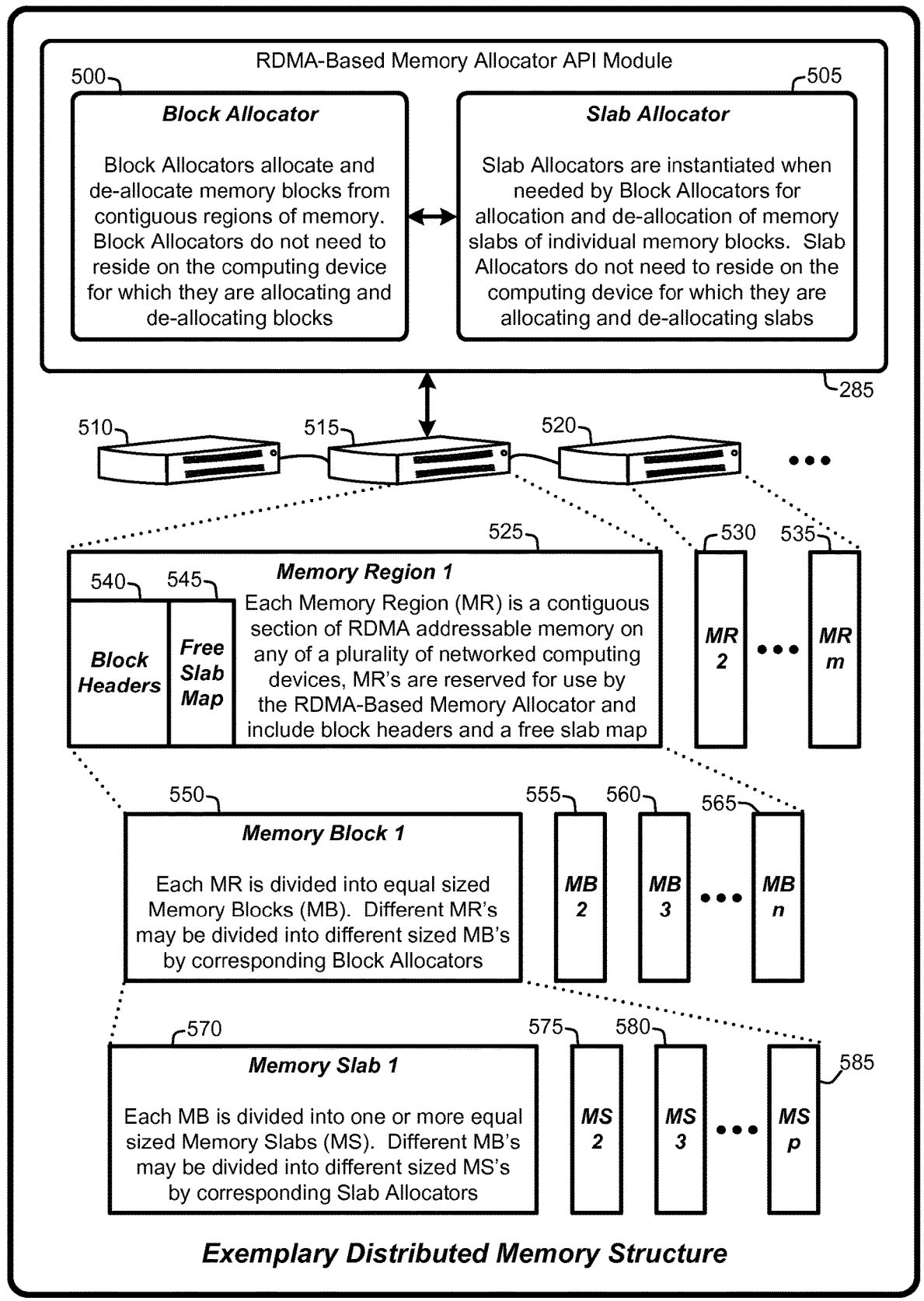
FIG. 5 illustrates an exemplary distributed memory structure controlled by the Key-Value Manager.

FIG. 5 illustrates an exemplary distributed memory structure of regions divided into a metadata section including block headers for use by the Key-Value Manager. For example, as illustrated by FIG. 5, the optional RDMA-Based Memory Allocator API Module 285 instantiates one or more block allocators 500 and slab allocators, on as as-needed basis. As mentioned above, the block allocators 500 allocate memory blocks from contiguous regions of memory. Further, block allocators 500 do not need to reside on the computing device for which they are allocating blocks. Similarly, slab allocators 505 are instantiated when needed by block allocators 500 for allocation of memory slabs of individual memory blocks. As with the block allocators 500, the slab allocators 505 do not need to reside on the computing device for which they are allocating slabs.

Further, as illustrated by FIG. 5, optional RDMA-Based Memory Allocator API Module 285 resides on one or more networked computing devices or servers (510, 515, and 520). One or more of these networked computing devices or servers (510, 515, and 520) hosts one or more memory regions (525, 530, 535) that is reserved for use by the Key-Value Manager. Each memory region (525, 530, 535) is a contiguous section of RDMA addressable memory on any of the networked computing devices. Further, in various implementations, each memory region (525, 530, 535) includes block headers 540 and a free slab map 545.

In addition, as illustrated by FIG. 5, in various implementations, each memory region (525, 530, 535) is divided into one or more equal sized memory blocks (550, 555, 560, 565). Different memory regions (525, 530, 535) may be divided into different sized memory blocks (550, 555, 560, 565) by corresponding block allocators 500.

Finally, as illustrated by FIG. 5, in various implementations, each memory block (550, 555, 560, 565) is divided into one or more equal sized memory slabs (570, 575, 580, 585). Different memory blocks (550, 555, 560, 565) may be divided into different sized memory slabs (570, 575, 580, 585) by corresponding slab allocators 505.

Figure 6:
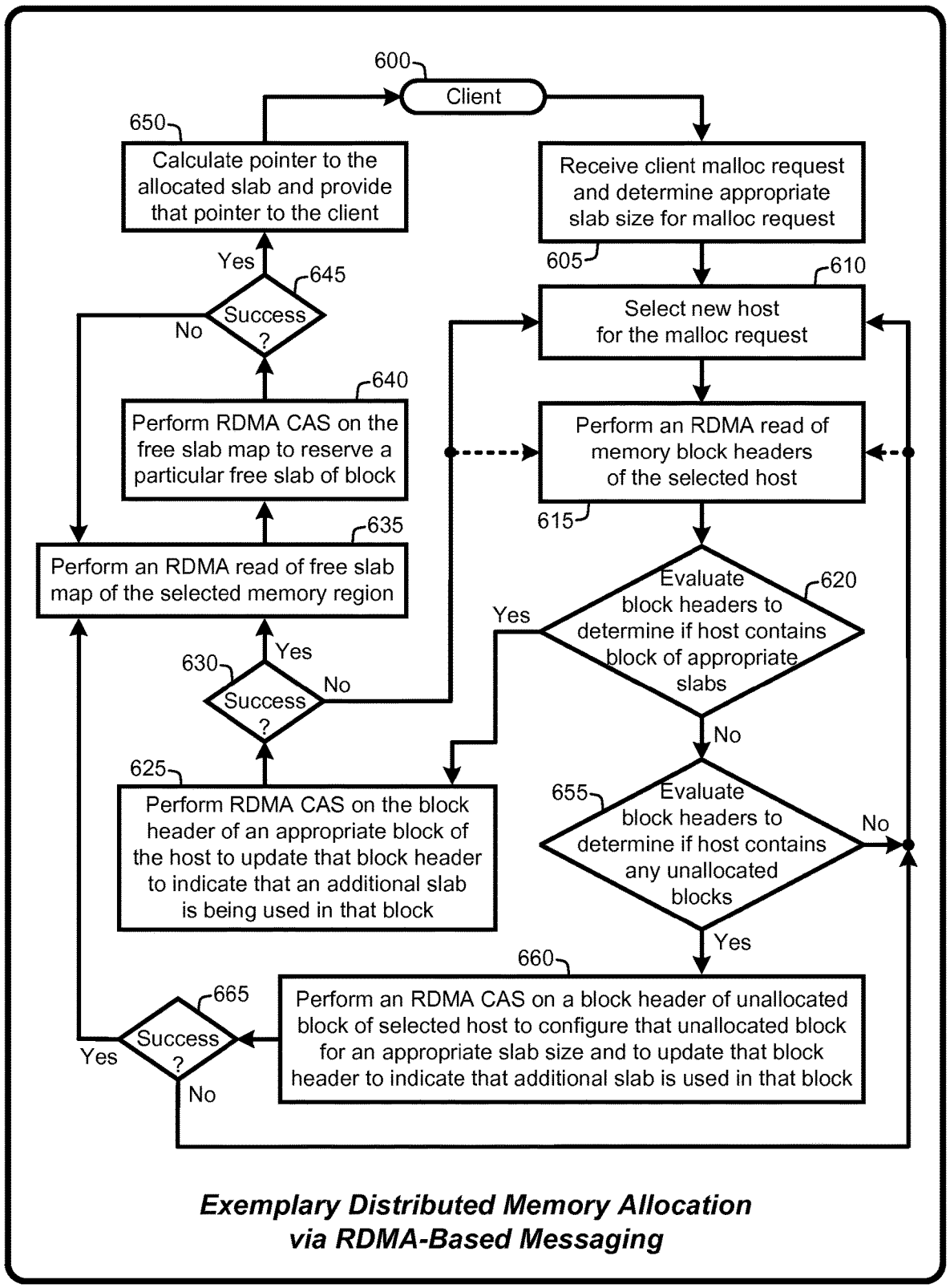
FIG. 6 illustrates a general flow diagram that illustrates various exemplary techniques for effecting RDMA-based distributed memory allocations.

FIG. 6 illustrates various implementations of the optional RDMA-based memory allocation features of the RDMA-Based Memory Allocator API component of the Key-Value Manager. Furthermore, while the system diagram of FIG. 6 illustrates a high-level view of various implementations of the Key-Value Manager, FIG. 6 is not intended to provide an exhaustive or complete illustration of every possible implementation of the Key-Value Manager as described throughout this document. In addition, any boxes and interconnections between boxes that may be represented by broken or dashed lines in FIG. 6 represent alternate implementations of the Key-Value Manager described herein. Further, any or all of these alternate implementations, as described herein, may be used in combination with other alternate implementations that are described throughout this document.

In general, as illustrated by FIG. 6, the memory allocation processes enabled by the RDMA-Based Memory Allocator API component of the Key-Value Manager begin operation by receiving 605 a memory allocation (malloc) request from a client 600, and determining a memory size for an appropriate slab size for that malloc request. The size of this malloc is generally based on a request by some application, process, thread, etc., of the client for some particular amount of memory. For example, in the case of the key-value store, slab size is generally set to be equal to or less than the maximum size that can be written via a single RDMA write, thus enabling entire nodes in allocated slabs to be read or written with a single RDMA read or write operation. The RDMA-Based Memory Allocator API then selects 610 a particular host and/or memory region from which to service the malloc request of the client 600. In response to the client malloc request, the RDMA-Based Memory Allocator API performs 615 an RDMA read of the portion of the selected memory region that contains the block headers for that memory region. The RDMA-Based Memory Allocator API then evaluates 620 these block headers to determine if that memory region of the host contains any allocated blocks of appropriately sized memory slabs (e.g., slabs of a size that are suitable for the intended malloc request).

Assuming that suitably sized memory slabs are available in one or more blocks of the selected memory region, the RDMA-Based Memory Allocator API then performs 625 an RDMA CAS operation on the block header of a selected one of those blocks with suitably sized slabs (referred to as an "appropriate block"). This CAS operation serves to update the block header of the appropriate block to indicate that an additional slab is being used in that block. In other words, the count of free slabs in the appropriate block is decreased by one via successful completion 630 of this RDMA CAS operation on the block header. In the case the multiple appropriate blocks exist for a particular slab size within the selected memory region, in various implementations, selection of the particular appropriate block is based on various selection methodologies, including, but not limited to, "best fit" allocation strategies, random selection, selection based on block address order, etc.

Furthermore, upon successful completion of the RDMA CAS to update the appropriate block header to decrement the number of free slabs, the RDMA-Based Memory Allocator API then performs 635 an RDMA read of the free slab map of the selected memory region. Next, given the free slab map, the RDMA-Based Memory Allocator API selects one of the free slabs in the appropriate block and performs 640 an RDMA CAS operation on the free slab map to update the free slab map to show the selected slab as being allocated (e.g., change 0 to 1 in the free slab map to indicate that the selected free slab is now an allocated slab). In other words, if successful 645, this CAS operation on the free slab map reserves a selected free slab of the appropriate block by updating the corresponding entry in the free slab map. In response to a successful 645 reservation of the slab via the CAS message, the RDMA-Based Memory Allocator API calculates 650 a reference to the allocated slab and provides that reference to the client 600, thus completing the malloc request.

As mentioned above, the client evaluates 620 block headers received via the an RDMA read 615 of the block headers of the selected host to determine if the host contains any blocks of appropriately sized memory slabs. In the case that suitably sized memory slabs are not available in one or more blocks of the host, the client further evaluates 655 those block headers to determine whether the host holds any free or unallocated blocks (e.g., memory blocks that have not yet been reserved for a particular slab size, meaning that the block has not yet been divided into slabs, and is therefore available for allocation). In this case, assuming that the host contains one or more free blocks, the client performs 660 an RDMA CAS operation on the block header of a selected one of the free blocks to reserve or allocate that block. If successful 665, this CAS operation configures the selected free block for the appropriate slab size by updating the metadata in the corresponding block header to specify the slab size for that block and to decrement the number of free slabs in that block by one. Once this previously free block has been configured for the appropriate slab size, the RDMA-Based Memory Allocator API then proceeds to reserve one of the slabs in the newly configured block via the above-described sequence of performing 635 the RDMA read of the free slab map, performing 640 the RDMA CAS operation on the free slab map, and calculating 650 and providing the corresponding reference to the client 600 to complete the malloc request.

As mentioned above, following the evaluation 620 to determine whether the host contains blocks of appropriately sized slabs, the RDMA-Based Memory Allocator API performs 625 a CAS operation on the block header of a selected appropriate block. However, in the event that this CAS operation is not successful 630 for some reason (e.g., prior reservation via a malloc request by some other client), in various implementations, the RDMA-Based Memory Allocator API restarts the malloc process by selecting 610 a new host for the malloc request. However, memory is typically allocated at relatively high frequencies in the host in response to requests by the same or other clients. Consequently, in various implementations, rather than selecting 610 a new host, the RDMA-Based Memory Allocator API restarts the original malloc request on the same host by performing 615 a new RDMA read of the block headers for the originally selected memory region. In either case, as illustrated by FIG. 6, the restarted malloc process then continues as discussed above.

Similarly, if the evaluation 655 to determine whether the host contains any free or unallocated blocks indicates that no unallocated blocks are available, in various implementations, the RDMA-Based Memory Allocator API restarts the malloc process by either selecting 610 a new host for the malloc request, or repeating the performance 615 of the RDMA read of the memory block headers of the selected host. As illustrated by FIG. 6, the restarted malloc process then continues as discussed above.

Similarly, as discussed above, under various circumstances, the RDMA-Based Memory Allocator API performs 660 an RDMA CAS operation on the block header of a selected one of the free blocks to reserve or allocate that block. However, in the event that this CAS operation is not successful 665 for some reason (e.g., prior reservation via a malloc request by some other client), in various implementations, the RDMA-Based Memory Allocator API restarts the malloc process by either selecting 610 a new host for the malloc request, or repeating the performance 615 of the RDMA read of the memory block headers of the selected host. As illustrated by FIG. 6, the restarted malloc process then continues as discussed above.

2.7 Distributed Memory Allocation Considerations:

As mentioned above, the RDMA-Based Memory Allocator API component of the Key-Value Manager performs allocations of shared memory distributed across a network. Further, references to allocated memory are provided to clients for use in reading and writing to allocated memory slabs. The following paragraphs discuss some of the considerations of various implementations for applying the RDMA-Based Memory Allocator API to perform memory allocations based solely on RDMA messaging. A discussion of memory allocation using combinations of RDMA and RPC is provided below in Section 2.8.

In various implementations, the RDMA-Based Memory Allocator API operates under several constraints, none of which is mandatory, for purposes of simplifying overall system configuration and reducing both bandwidth and latency for performing memory allocations. For example, in various implementations, the RDMA-Based Memory Allocator API enforces a maximum allocation size (e.g., 2 GB memory regions, 1 MB blocks, etc.) that is specified during initial setup of the Key-Value Manager on any particular network.

In various implementations, the RDMA-Based Memory Allocator API uses a predetermined or static overhead for allocations. For example, consider a 2 GB memory region size for allocations. In this case, the RDMA-Based Memory Allocator API may use a static amount of that memory region (e.g., 0.1 GB) for metadata and the remainder (e.g., 1.9 GB) for block allocations. However, in various implementations, the RDMA-Based Memory Allocator API applies a variable overhead size for metadata based on the size of regions, block sizes, and number of and size of slabs in each block.

An additional constraint in various implementations is that once memory has been reserved, that memory is not moved. This ensures that the allocated memory is accessible via RDMA reads and writes. Further, in various implementations, the RDMA-Based Memory Allocator API does not use any kind of blocking code (e.g., critical sections, wait for single object, etc.) because the underlying kernel code would introduce considerably more latency than RDMA reads, writes, or CAS operations. However, even though latency may increase, the use blocking code may be applied in various implementations of the RDMA-Based Memory Allocator API to address particular network considerations for specific applications.

The following discussion summarizes communication between two networked computers (e.g., "Client" and "Host") during an exemplary memory allocation by the RDMA-Based Memory Allocator API component of the Key-Value Manager. The following sequence of events is not intended to describe or include all of the various implementations of the RDMA-Based Memory Allocator API component of the Key-Value Manager, and is provided only for purposes of example.

1. Client (computer A) determines the following information: where the memory region that it wants to allocate memory from is located (e.g., computer B, Host), and the desired allocation size. Consider that computer A can be the same computer as computer B, but does not have to be the same as computer B. In other words, this allocation process may be applied on a single computer acting as both Client and Host, or between different computers.
2. The Client performs an RDMA read of the block headers in the memory region on the Host.
3. The Client evaluates the block headers and determines one of the following:
   (a) The memory region of the Host contains an appropriate block from which to allocate the memory slab;
   (b) There are no appropriate allocated blocks on the Host, but there are one or more unallocated blocks on the Host; or
   (c) There are no appropriate allocated blocks on the Host and there are no unallocated blocks on the Host.
4. Based on the determination in Step 3, the Client will perform one of the following actions:
   (a) If 3(a), then the Client will perform an RDMA CAS operation on the block header of the selected block on the Host, this CAS operation will update the block header to indicate that an additional slab is being used in that block;
   (b) If 3(b), then the Client will perform an RDMA CAS on the header of an unallocated block on the Host to allocate that block, this CAS operation will initialize all of the metadata in the corresponding block header including indicating that an additional slab is being used in that block;
   (c) If 3(c), then the Client will fail the allocation. In response to this failure, several options are possible.
      i. Return an allocation error to the Client (or whatever process, thread or application on the Client made the initial malloc request);
      ii. Return to Step 1. Memory allocations are dynamic. Therefore, it is possible that one or more blocks or slabs have become available on the Host since the allocation failure; or
      iii. Return to Step 2. Memory allocations are dynamic. Therefore, it is possible that one or more blocks or slabs have become available on the Host since the allocation failure.
5. Assuming that the Client successfully performs Step 4(a) or Step 4(b), the Client will then perform an RDMA read of the free slab map of the Host.
6. In response to Step 5, the Client will evaluate the free slab map to identify an unallocated slab, and will then reserve that unallocated slab via an RDMA CAS operation on the free slab map of the Host to update the corresponding slab entry as being used.
7. In response to Step 6, the RDMA-Based Memory Allocator computes a reference to the allocated slab and provides that reference to the Client to complete the malloc operation.

2.8 Using RDMA-Based RPC Messages:

As mentioned above, in various implementations, the Key-Value Manager combines RDMA messaging and remote procedure call (RPC) requests to provide reads and writes to the key-value store and optional fast lock-free memory allocations for shared memory distributed across multiple servers in an RDMA-based network. In such cases, the CPUs of the client and host servers only become involved when they execute a read, write, or memory allocation request specified by an RPC request transmitted between the client and the host servers via RDMA-based messaging.

For example, in various implementations, an application, process, or thread executing on any of the networked servers makes a read, write, or malloc request that is intercepted by the Key-Value Manager API. The Key-Value Manager API of that server then applies an RDMA write to enter an RPC read, write, or malloc request to a memory buffer of another one of the servers (which could be the same or a different one of the servers). One or more local threads on the receiving server then monitor that buffer for receipt of an RPC malloc request.

In response to receipt of that RPC-based request, the CPU of the receiving server (instead of the NIC in the case of RDMA-based requests) executes the same sequences of RDMA reads, writes, and CAS operations on the reserved memory to perform reads and writes on the key-value store, and to perform the optional lock-free memory allocation. In response to node reads, the receiving server then sends the contents of the node to the requesting server by applying an RDMA write of the contents of that node to a memory buffer of the requesting server. One or more local threads on the requesting server monitor the buffer of that server for receipt of the node contents. Similarly, in response to malloc requests, the receiving server sends a reference to the address of the newly allocated memory to the requesting server by applying an RDMA write of that reference to a memory buffer of the requesting server. One or more local threads on the requesting server monitor the buffer of that server for receipt of the memory reference.

The overhead and latency of sending a RPC message via RDMA is higher than the techniques described herein that rely solely on RDMA messaging. However, one of the advantages of this process is that reads, writes, and CAS operations performed by the CPU in response to receipt of an RPC message are typically much faster than reads, writes, and CAS operations performed by the NIC in response to receipt of RDMA messages.

2.9 Replicating Nodes Across Multiple Servers:

In various implementations, the Key-Value Manager optionally replicates individual nodes or entire B-Trees across one or more additional servers to provide data redundancy in the event of data corruption on a particular server or loss of a particular server for any reason. Similarly, allocated memory slabs, blocks, or entire memory regions, may also be replicated. In the simplest case, entire memory regions are replicated.

For example, when replicating a state of allocated memory, that memory is first allocated to a primary location using the RDMA-based techniques described herein. Once the memory has been allocated on the primary, the Key-Value Manager optionally copies each corresponding memory region to one or more replicas (on the same or different servers). As such, if there are no ongoing allocations, each of the replicas will be identical to the primary.

In general, in various implementations, the optional replication processes performed by the Key-Value Manager are implemented as a simplified version of the allocation processes performed by the RDMA-Based Memory Allocator API component of the Key-Value Manager API, as described above. However, any known technique for replicating memory may be applied by the Key-Value Manager.

For example, in the case of allocations, once a particular block and slab have been allocated to the primary, the Key-Value Manager API knows exactly which block and slab have been allocated in particular memory regions. Therefore, after that allocation has been completed, the Key-Value Manager API applies the RDMA-based techniques described above to create each replica by performing the steps described below (which should be understood in view of the preceding detailed description regarding RDMA-based memory allocations). However, as mentioned above, after any memory has been allocated by the Key-Value Manager, any known technique for replicating memory may be applied to create replicas. Assuming the use of the RDMA-based techniques described herein, replication is accomplished (for each replica of the primary) via the following steps:

1. Apply an RDMA CAS operation to update the number of free slabs in the appropriate block header of the replica memory region;
2. Apply an RDMA CAS operation to mark the appropriate slab as being used in the free slab map of the replica; and
3. Propagate any writes to allocated slabs on the primary to each of the replicas. In various implementations, checksums of nodes of the primary are validated, as discussed above, prior to performing writes to nodes of the replica.

3.0 Operational Summary of the Key-Value Manager

Figure 7:
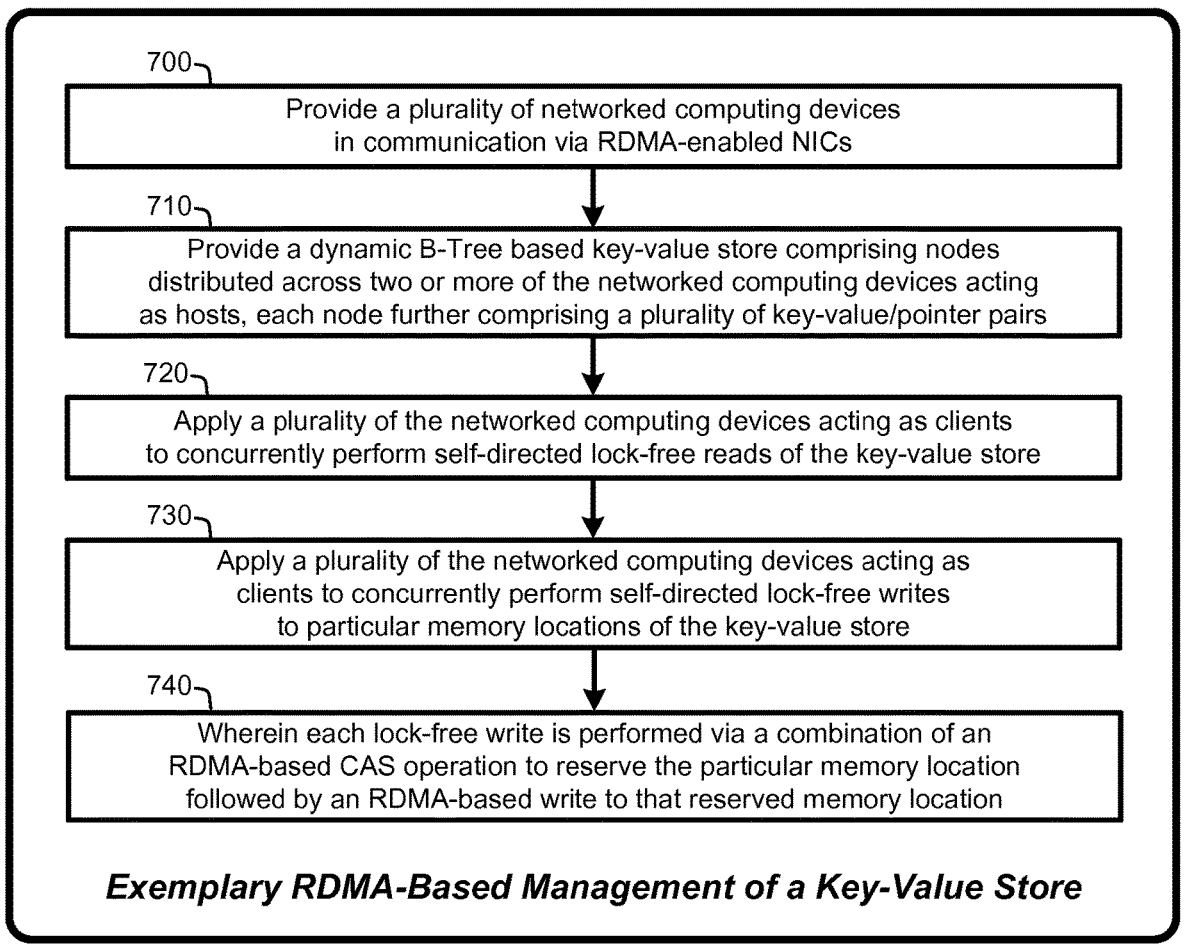
FIG. 7 illustrates an exemplary process for implementing the RDMA-based B-Tree key-value store.
Figure 8:
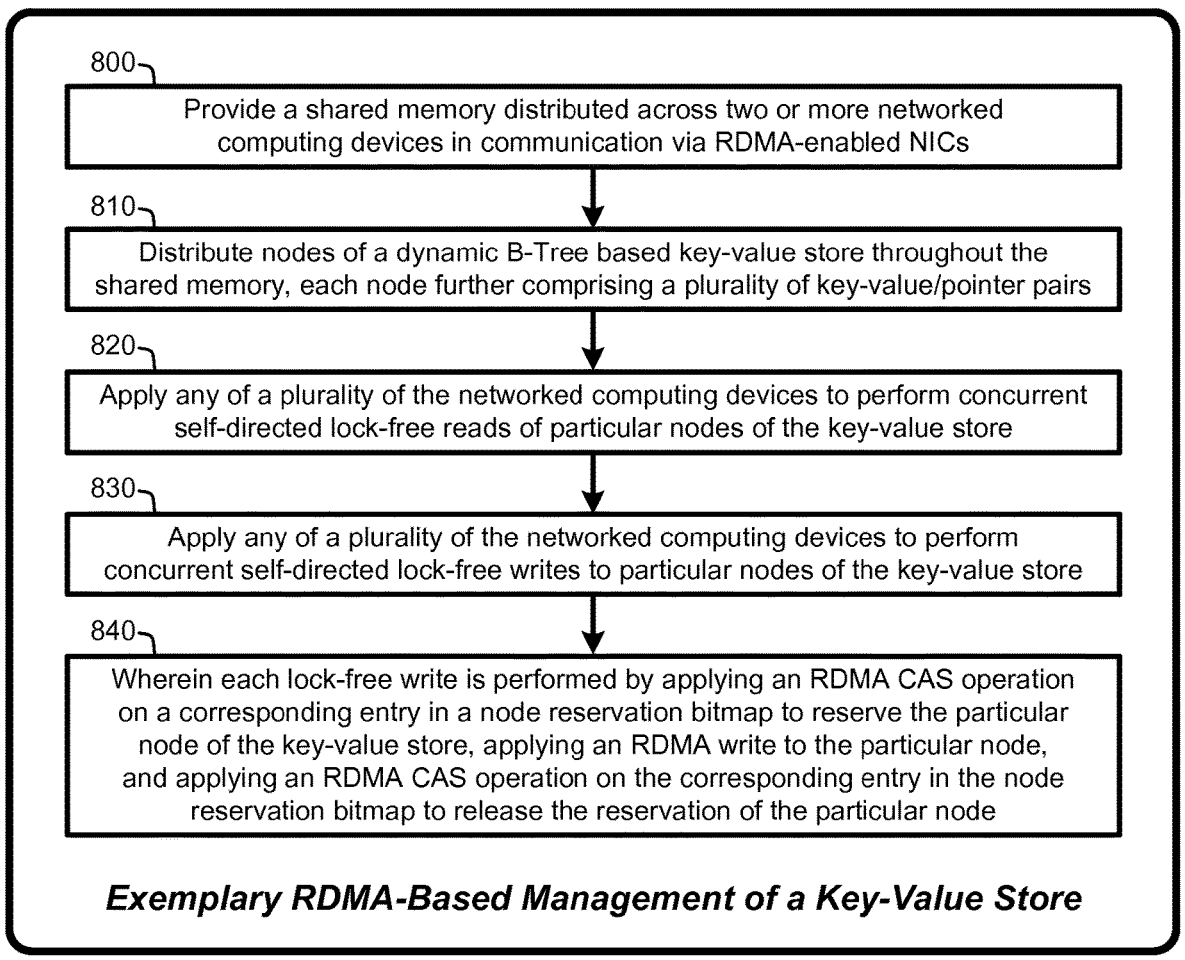
FIG. 8 illustrates an exemplary process for implementing the RDMA-based B-Tree key-value store.
Figure 9:
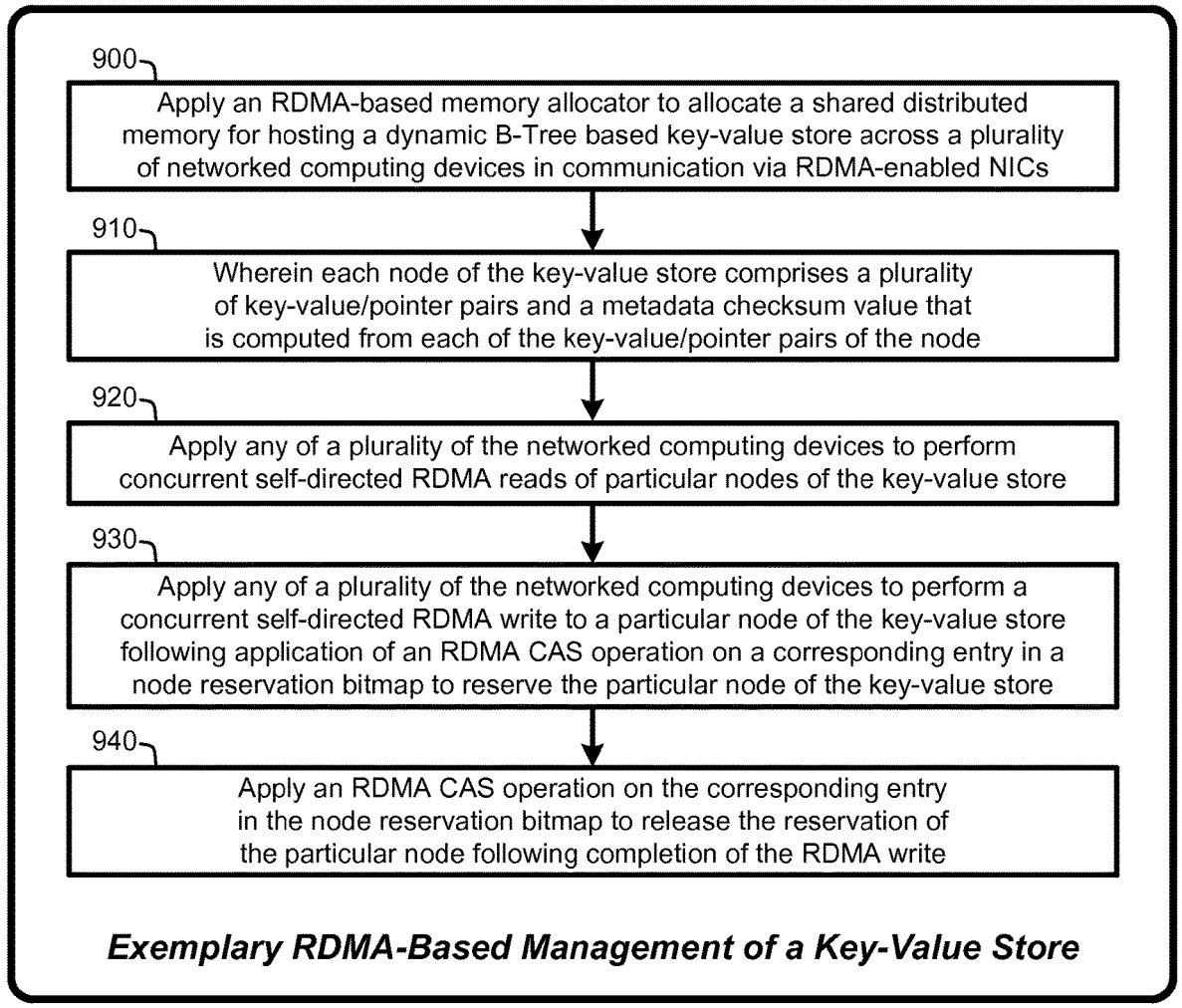
FIG. 9 illustrates an exemplary process for implementing the RDMA-based B-Tree key-value store.

The processes described above with respect to FIG. 1 through FIG. 6, and in further view of the detailed description provided above in Sections 1 and 2, are illustrated by the general operational flow diagrams of FIG. 7 through FIG. 9. In particular, FIG. 7 through FIG. 9 provide exemplary operational flow diagrams that summarizes the operation of some of the various implementations of the Key-Value Manager. FIG. 7 through FIG. 9 are not intended to provide an exhaustive representation of all of the various implementations of the Key-Value Manager described herein, and the implementations represented in these figures are provided only for purposes of explanation.

Further, any boxes and interconnections between boxes that may be represented by broken or dashed lines in FIG. 7 through FIG. 9 represent optional or alternate implementations of the Key-Value Manager described herein, and that any or all of these optional or alternate implementations, as described below, may be used in combination with other alternate implementations that are described throughout this document.

In general, as illustrated by FIG. 7, in various implementations, the Key-Value Manager begins operation by providing (700) a plurality of networked computing devices in communication via RDMA-enabled NICs. In addition, the Key-Value Manager provides (710) a dynamic B-Tree based key-value store comprising nodes distributed across two or more of the networked computing devices acting as hosts. Each of these nodes further comprises a plurality of key-value/pointer pairs. In addition, the Key-Value Manager enables any of a plurality of the networked computing devices acting as clients to concurrently perform (720) self-directed lock-free reads of the key-value store. Further, the Key-Value Manager enables any of a plurality of the networked computing devices acting as clients to concurrently perform (730) self-directed lock-free writes to particular memory locations of the key-value store. Finally, each lock-free write is performed (740) via a combination of an RDMA-based CAS operation to reserve the particular memory location followed by an RDMA-based write to that reserved memory location.

Similarly, as illustrated by FIG. 8, in various implementations, the Key-Value Manager begins operation by providing (800) a shared memory distributed across two or more networked computing devices in communication via RDMA-enabled NICs. Further, the Key-Value Manager distributes (810) nodes of a dynamic B-Tree based key-value store throughout the shared memory. Each of these nodes further comprises a plurality of key-value/pointer pairs. The Key-Value Manager enables any of a plurality of the networked computing devices to perform (820) concurrent self-directed lock-free reads of particular nodes of the key-value store. In addition, the Key-Value Manager enables any of a plurality of the networked computing devices to perform (830) concurrent self-directed lock-free writes to particular nodes of the key-value store. Finally, each lock-free write is performed (840) by applying an RDMA CAS operation on a corresponding entry in a node reservation bitmap to reserve the particular node of the key-value store, applying an RDMA write to the particular node, and applying an RDMA CAS operation on the corresponding entry in the node reservation bitmap to release the reservation of the particular node.

Similarly, as illustrated by FIG. 9, in various implementations, the Key-Value Manager begins operation by applying (900) an RDMA-based memory allocator to allocate a shared distributed memory for hosting a dynamic B-Tree based key-value store across a plurality of networked computing devices in communication via RDMA-enabled NICs. Further, each node of the key-value store comprises (910) a plurality of key-value/pointer pairs and a metadata checksum value that is computed from each of the key-value/pointer pairs of the node. In addition, the Key-Value Manager enables any of a plurality of the networked computing devices to perform (920) concurrent self-directed RDMA reads of particular nodes of the key-value store. In combination, the Key-Value Manager enables any of a plurality of the networked computing devices to perform (930) a concurrent self-directed RDMA write to a particular node of the key-value store following application of an RDMA CAS operation on a corresponding entry in a node reservation bitmap to reserve the particular node of the key-value store. Finally, the Key-Value Manager applies (940) an RDMA CAS operation on the corresponding entry in the node reservation bitmap to release the reservation of the particular node following completion of the RDMA write.

4.0 Exemplary Implementations of the Key-Value Manager

The following paragraphs summarize various examples of implementations that may be claimed in the present document. The implementations summarized below are not intended to limit the subject matter that may be claimed in view of the detailed description of the Key-Value Manager. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, the Key-Value Manager applies RDMA messaging in combination with an RDMA-based memory allocator to implement a distributed and lock-free B-Tree based key-value store. In various implementations, the Key-Value Manager is implemented as a standalone library running concurrently on large numbers of networked computing devices. The RDMA-based memory allocator of the Key-Value Manager allocates and accesses the memory of the key-value store via various sequences of RDMA messages (e.g., RDMA reads, RDMA writes, and RDMA atomic compare and swap (CAS) operations). As such, CPUs of computing devices hosting the memory of the key-value store do not need to be notified of, or involved in, RDMA-based reads and writes to that memory. Consequently, CPU utilization for any computing device that hosts any portion of the key-value store is minimal, thereby enabling the Key-Value Manager to scale to very large numbers of concurrent accesses by very large numbers of computing devices.

As a first example, in various implementations, a dynamic B-Tree based key-value store system is implemented via means, processes or techniques for providing a plurality of networked computing devices in communication via RDMA-enabled NICs. The dynamic B-Tree based key-value store comprises nodes distributed across two or more of the networked computing devices, each node further comprising a plurality of key-value/pointer pairs. In addition, a plurality of the networked computing devices concurrently perform self-directed lock-free reads of the key-value store. Further, a plurality of the networked computing devices concurrently perform self-directed lock-free writes to particular memory locations of the key-value store. In various implementations, each of these lock-free writes is performed via a combination of an RDMA-based CAS operation to reserve the particular memory location followed by an RDMA-based write to that reserved memory location.

As a second example, in various implementations, the first example is further modified via means, processes or techniques for reserving the particular memory location by performing the RDMA-based CAS operation on a corresponding entry in a node reservation bitmap to reserve a particular node of the key-value store prior to performing the RDMA-based writes to that node.

As a third example, in various implementations, any of the first example and the second example are further modified via means, processes or techniques for performing the RDMA-based CAS operation on a corresponding entry in a node reservation bitmap to reserve a particular element of a particular node of the key-value store prior to performing the RDMA-based writes to that element.

As a fourth example, in various implementations, any of the first example, the second example and the third example are further modified via means, processes or techniques for including a metadata section in each node comprising a checksum value computed from each of the key-value/pointer pairs of the node.

As a fifth example, in various implementations, the fourth example is further modified via means, processes or techniques for performing node reads computing a checksum value from the plurality of key-value/pointer pairs in the node, and repeating the read of the node until the computed checksum value matches the checksum value in the metadata of the node.

As a sixth example, in various implementations, any of the first example, the second example, the third example, the fourth example and the fifth example are further modified via means, processes or techniques wherein the self-directed lock-free reads of the key-value store are RDMA-based reads.

As a seventh example, in various implementations, any of the first example, the second example, the third example, the fourth example, the fifth example, and the sixth example are further modified via means, processes or techniques for allocating memory for leaf nodes of a parent node whenever that parent node is created, and automatically populating the parent node with key-value/pointer pairs to the allocated memory of the leaf nodes.

As an eighth example, in various implementations, any of the first example, the second example, the third example, the fourth example, the fifth example, the sixth example and the seventh example are further modified via means, processes or techniques for applying an RDMA-based distributed memory allocator to allocate the memory for each node.

As a ninth example, in various implementations, any of the first example, the second example, the third example, the fourth example, the fifth example, the sixth example, the seventh example and the eighth example are further modified via means, processes or techniques for applying any of the networked computing devices to concurrently act as any combination of a host of memory allocated for a portion of the nodes of the key-value store and a client for performing any combination of lock-free reads and writes of nodes distributed on any of the networked computing devices.

As a tenth example, in various implementations, a computer-implemented process is implemented via means, processes or techniques for distributing a shared memory across two or more networked computing devices in communication via RDMA-enabled NICs. In various implementations, nodes of a dynamic B-Tree based key-value store are distributed throughout the shared memory, with each node further comprising a plurality of key-value/pointer pairs. In various implementations, any of a plurality of the networked computing devices are applied to perform concurrent self-directed lock-free reads of particular nodes of the key-value store. In addition, any of a plurality of the networked computing devices are applied to perform concurrent self-directed lock-free writes to particular nodes of the key-value store. In various implementations, each lock-free write is performed by applying an RDMA CAS operation on a corresponding entry in a node reservation bitmap to reserve the particular node of the key-value store, applying an RDMA write to the particular node, and applying an RDMA CAS operation on the corresponding entry in the node reservation bitmap to release the reservation of the particular node.

As an eleventh example, in various implementations, the tenth example is further modified via means, processes or techniques wherein each node further comprises a metadata section comprising a checksum value computed from each of the key-value/pointer pairs of the node.

As a twelfth example, in various implementations, any of the tenth example and the eleventh example are further modified via means, processes or techniques for performing any read of any node by computing a checksum value from the key-value/pointer pairs of the node, and repeating the read of the node until the computed checksum value matches the checksum value in the metadata of the node.

As a thirteenth example, in various implementations, any of the tenth example, the eleventh example and the twelfth example are further modified via means, processes or techniques for performing the self-directed lock-free reads of the key-value store are RDMA reads.

As a fourteenth example, in various implementations, any of the tenth example, the eleventh example, the twelfth example and the thirteenth example are further modified via means, processes or techniques for applying an RDMA-based memory allocator to allocate memory for leaf nodes of a parent node whenever that parent node is created, and automatically populating the parent node with key-value/pointer pairs to the allocated memory of the leaf nodes.

As a fifteenth example, in various implementations, any of the tenth example, the eleventh example, the twelfth example, the thirteenth example and the fourteenth example are further modified via means, processes or techniques for applying any of the networked computing devices to concurrently host a portion of the shared memory while performing any combination of reads and writes to any portion of the shared memory hosted by any of the networked computing devices.

As a sixteenth example, a computer-readable storage device having computer executable instructions is implemented by causing a computing device to execute a method via means, processes or techniques for applying an RDMA-based memory allocator to allocate a shared distributed memory for hosting a dynamic B-Tree based key-value store across a plurality of networked computing devices in communication via RDMA-enabled NICs. In various implementations, each node of the key-value store comprises a plurality of key-value/pointer pairs and a metadata checksum value computed from each of the key-value/pointer pairs of the node. Further, in various implementations, any of a plurality of the networked computing devices are applied to perform concurrent self-directed RDMA reads of particular nodes of the key-value store. In addition, in various implementations any of a plurality of the networked computing devices are applied to perform a concurrent self-directed RDMA write to a particular node of the key-value store following application of an RDMA CAS operation on a corresponding entry in a node reservation bitmap to reserve the particular node of the key-value store. Further, in various implementations, an RDMA CAS operation on the corresponding entry in the node reservation bitmap is applied to release the reservation of the particular node following completion of the RDMA write.

As a seventeenth example, in various implementations, the sixteenth example is further modified via means, processes or techniques for performing any RDMA read of any node by computing a checksum value from the plurality of key-value/pointer pairs in the node, and repeating the RDMA read of the node until the computed checksum value matches the checksum value in the metadata of the node.

As an eighteenth example, in various implementations, any of the sixteenth example and the seventeenth example are further modified via means, processes or techniques for performing any RDMA write to any node by comparing a checksum computed from value from the plurality of key-value/pointer pairs in the node following the reservation, and if the computed checksum does not match the metadata checksum, marking that node as bad and performing the write to a replica of that node.

As a nineteenth example, in various implementations, any of the sixteenth example, the seventeenth example, and the eighteenth example are further modified via means, processes or techniques for automatically allocating memory for each of a plurality of leaf nodes of a parent node whenever that parent node is created, and automatically populating the parent node with key-value/pointer pairs to the allocated memory of the leaf nodes.

As a twentieth example, in various implementations, any of the sixteenth example, the seventeenth example, the eighteenth example and the nineteenth example are further modified via means, processes or techniques for applying any of the networked computing devices to concurrently host a portion of the shared distributed memory while performing any combination of RDMA reads and RDMA writes to any portion of the shared distributed memory hosted by any of the networked computing devices.

5.0 Exemplary Operating Environments

Figure 10:
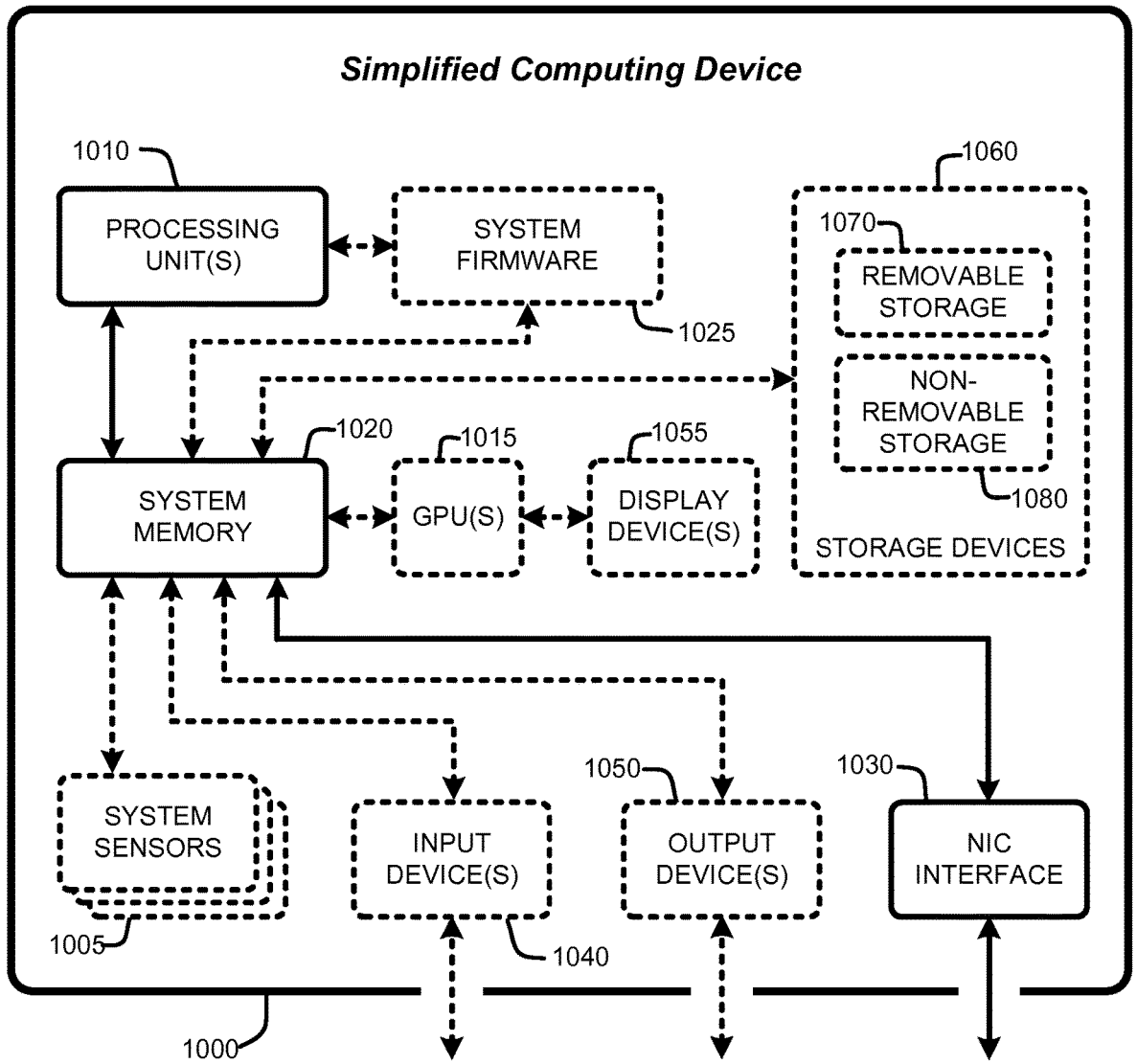
FIG. 10 is a general system diagram depicting a simplified general-purpose computing device having simplified computing and I/O capabilities for use in effecting various implementations of the Key-Value Manager, as described herein.

The Key-Value Manager implementations described herein are operational within numerous types of general purpose or special purpose computing system environments or configurations. FIG. 10 illustrates a simplified example of a general-purpose computer system on which various implementations and elements of the Key-Value Manager, as described herein, may be implemented. Any boxes that are represented by broken or dashed lines in the simplified computing device 1000 shown in FIG. 10 represent alternate implementations of the simplified computing device. As described below, any or all of these alternate implementations may be used in combination with other alternate implementations that are described throughout this document.

The simplified computing device 1000 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Key-Value Manager implementations described herein, the device should have a sufficient computational capability and system memory to enable basic computational operations. In particular, the computational capability of the simplified computing device 1000 shown in FIG. 10 is generally illustrated by one or more processing unit(s) 1010, and may also include one or more graphics processing units (GPUs) 1015, either or both in communication with system memory 1020. The processing unit(s) 1010 of the simplified computing device 1000 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 1000 may also include other components, such as, for example, a network interface controller 1030. The simplified computing device 1000 may also include one or more conventional computer input devices 1040 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 1000 and with any other component or feature of the Key-Value Manager, including input, output, control, feedback, and response to one or more users or other devices or systems associated with the Key-Value Manager, are enabled by a variety of Natural User Interface (NUI) scenarios. The NUI techniques and scenarios enabled by the Key-Value Manager include, but are not limited to, interface technologies that allow one or more users user to interact with the Key-Value Manager in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 1040 or system sensors 1005. Such NUI implementations are also enabled by the use of various techniques including, but not limited to, information derived from system sensors 1005 or other input devices 1040 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices.

Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Key-Value Manager.

However, the aforementioned exemplary NUI scenarios may be further augmented by combining the use of artificial constraints or additional signals with any combination of NUI inputs. Such artificial constraints or additional signals may be imposed or generated by input devices 1040 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Key-Value Manager.

The simplified computing device 1000 may also include other optional components such as one or more conventional computer output devices 1050 (e.g., display device(s) 1055, audio output devices, video output devices, devices for transmitting wired or wireless data transmissions, and the like). Typical network interface controllers (NICs) 1030, input devices 1040, output devices 1050, and storage devices 1060 for general-purpose computers are well known to those skilled in the art, and will not be described in detail herein.

The simplified computing device 1000 shown in FIG. 10 may also include a variety of computer-readable media. Computer-readable media can be any available media that can be accessed by the computing device 1000 via storage devices 1060, and include both volatile and nonvolatile media that is either removable 1070 and/or non-removable 1080, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), Blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information or content delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Key-Value Manager implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 1025, hardware, or any combination thereof to control a computer to implement the disclosed subject matter. The term "article of manufacture" as used herein is intended to encompass a computer program accessible from any computer-readable device, or media.

The Key-Value Manager implementations described herein may be further described in the general context of computer-executable instructions, such as program modules, being executed by a computing device. Generally, program modules include routines, programs, objects, components, data structures, and the like, that perform particular tasks or implement particular abstract data types. The Key-Value Manager implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations

The foregoing description of the Key-Value Manager has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Key-Value Manager. It is intended that the scope of the Key-Value Manager be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Key-Value Manager described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A system, comprising:
a plurality of networked computing devices in communication via remote direct memory access-enabled network interface controllers;
a dynamic B-Tree based key-value store comprising nodes distributed across two or more of the networked computing devices, each node further comprising a plurality of key-value/pointer pairs;
a plurality of the networked computing devices concurrently performing self-directed lock-free reads of the key-value store;
a plurality of the networked computing devices concurrently performing self-directed lock-free writes to particular memory locations of the key-value store; and
each lock-free write being performed via a combination of a remote direct memory access-based compare and swap operation to reserve one of the particular memory locations of the key-value store by modifying a reservation bitmap via the remote direct memory access-based compare and swap operation followed by a remote direct memory access-based write to that reserved memory location, and upon successful completion of the remote direct memory access-based write to the reserved memory location, another remote direct memory access-based compare and swap operation to further modify the reservation bitmap to indicate that the reserved memory location is available.

2. The system of claim 1 wherein reserving the particular memory location further comprises performing the remote direct memory access-based compare and swap operation on a corresponding entry in a node reservation bitmap to reserve a particular node of the key-value store prior to performing the remote direct memory access-based writes to that node.

3. The system of claim 1 wherein reserving the particular memory location further comprises performing the remote direct memory access-based compare and swap operation on a corresponding entry in a node reservation bitmap to reserve a particular element of a particular node of the key-value store prior to performing the remote direct memory access-based writes to that element.

4. The system of claim 1 wherein each node further comprises a metadata section of each node comprising a checksum value computed from each of the key-value/pointer pairs of the node.

5. The system of claim 4 wherein any read of any node further comprises:
computing a checksum value from the plurality of key-value/pointer pairs in the node; and
repeating the read of the node until the computed checksum value matches the checksum value in the metadata of the node.

6. The system of claim 1 wherein the self-directed lock-free reads of the key-value store are remote direct memory access-based reads.

7. The system of claim 1 further comprising:
allocating memory for leaf nodes of a parent node whenever that parent node is created; and
automatically populating the parent node with key-value/pointer pairs to the allocated memory of the leaf nodes.

8. The system of claim 7 further comprising applying a remote direct memory access-based distributed memory allocator to allocate the memory for each node.

9. The system of claim 1 wherein any of the networked computing devices concurrently acts as any combination of a host of memory allocated for a portion of the nodes of the key-value store and a client for performing any combination of lock-free reads and writes of nodes distributed on any of the networked computing devices.

10. A computer-implemented process, comprising:
a shared memory distributed across two or more networked computing devices in communication via remote direct memory access-enabled network interface controllers;
distributing nodes of a dynamic B-Tree based key-value store throughout the shared memory, each node further comprising a plurality of key-value/pointer pairs;
applying any of a plurality of the networked computing devices to perform concurrent self-directed lock-free reads of particular nodes of the key-value store;
applying any of a plurality of the networked computing devices to perform concurrent self-directed lock-free writes to particular nodes of the key-value store; and
each lock-free write further comprising:
applying a remote direct memory access compare and swap operation to modify a corresponding entry in a node reservation bitmap to reserve the particular node of the key-value store;
applying a remote direct memory access write to the particular node; and
upon successful completion of the remote direct memory access write to the particular node, applying a remote direct memory access compare and swap operation on the corresponding entry in the node reservation bitmap to further modify the node reservation bitmap to indicate release of the reservation of the particular node.

11. The computer-implemented process of claim 10 wherein each node further comprises a metadata section comprising a checksum value computed from each of the key-value/pointer pairs of the node.

12. The computer-implemented process of claim 11 wherein any read of any node further comprises:
computing a checksum value from the key-value/pointer pairs of the node; and
repeating the read of the node until the computed checksum value matches the checksum value in the metadata of the node.

13. The computer-implemented process of claim 10 wherein the self-directed lock-free reads of the key-value store are remote direct memory access reads.

14. The computer-implemented process of claim 10 further comprising:
applying a remote direct memory access-based memory allocator to allocate memory for leaf nodes of a parent node whenever that parent node is created; and
automatically populating the parent node with key-value/pointer pairs to the allocated memory of the leaf nodes.

15. The computer-implemented process of claim 10 wherein any of the networked computing devices concurrently hosts a portion of the shared memory while performing any combination of reads and writes to any portion of the shared memory hosted by any of the networked computing devices.

16. A computer-readable storage device having computer executable instructions stored therein, said instructions causing a computing device to execute a method comprising:
applying a remote direct memory access-based memory allocator to allocate a shared distributed memory for hosting a dynamic B-Tree based key-value store across a plurality of networked computing devices in communication via remote direct memory access-enabled network interface controllers;
each node of the key-value store comprising a plurality of key-value/pointer pairs and a metadata checksum value computed from each of the key-value/pointer pairs of the node;
applying any of a plurality of the networked computing devices to perform concurrent self-directed remote direct memory access reads of particular nodes of the key-value store;
applying any of a plurality of the networked computing devices to perform a concurrent self-directed remote direct memory access write to a particular node of the key-value store following application of a remote direct memory access compare and swap operation to modify a corresponding entry in a node reservation bitmap to reserve the particular node of the key-value store; and
upon successful completion of the remote direct memory access write to the particular node of the key-value store, applying a remote direct memory access compare and swap operation on the corresponding entry in the node reservation bitmap to further modify the corresponding entry to indicate release of the reservation of the particular node.

17. The computer-readable storage device of claim 16 wherein any remote direct memory access read of any node further comprises:
computing a checksum value from the plurality of key-value/pointer pairs in the node; and
repeating the remote direct memory access read of the node until the computed checksum value matches the checksum value in the metadata of the node.

18. The computer-readable storage device of claim 16 wherein any remote direct memory access write to any node further comprises:
comparing a checksum computed from the plurality of key-value/pointer pairs in the node following the reservation to the metadata checksum value; and
if the computed checksum does not match the metadata checksum, marking that node as bad and performing the write to a replica of that node.

19. The computer-readable storage device of claim 16 further comprising:
automatically allocating memory for each of a plurality of leaf nodes of a parent node whenever that parent node is created; and
automatically populating the parent node with key-value/pointer pairs to the allocated memory of the leaf nodes.

20. The computer-readable storage device of claim 16 wherein any of the networked computing devices concurrently hosts a portion of the shared distributed memory while performing any combination of remote direct memory access reads and remote direct memory access writes to any portion of the shared distributed memory hosted by any of the networked computing devices.

* * * * *